US009489939B2

(12) United States Patent
Chiba et al.

(10) Patent No.: US 9,489,939 B2
(45) Date of Patent: Nov. 8, 2016

(54) SPEECH SERVER MANAGING ONE OR A PLURALITY OF PIECES OF SPEECH TERMINAL-SPECIFYING INFORMATION AND USER-SPECIFYING INFORMATION

(71) Applicant: SHARP KABUSHIKI KAISHA, Osaka-shi, Osaka (JP)

(72) Inventors: Masahiro Chiba, Osaka (JP); Kazunori Shibata, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 145 days.

(21) Appl. No.: 14/496,545

(22) Filed: Sep. 25, 2014

(65) Prior Publication Data
US 2015/0088521 A1 Mar. 26, 2015

(30) Foreign Application Priority Data

Sep. 26, 2013 (JP) ................. 2013-200448

(51) Int. Cl.
G10L 13/047 (2013.01)
G06Q 10/10 (2012.01)

(52) U.S. Cl.
CPC ........... G10L 13/047 (2013.01); G06Q 10/107 (2013.01)

(58) Field of Classification Search
CPC .................................... G10L 13/047
USPC ........................................ 704/260
See application file for complete search history.

(56) References Cited

U.S. PATENT DOCUMENTS

| 6,678,866 B1 * | 1/2004 | Sugimoto | G06Q 30/02 715/203 |
| 6,901,431 B1 * | 5/2005 | Dodrill | H04L 67/34 379/88.17 |
| 7,085,253 B2 * | 8/2006 | Yang | H04L 69/164 370/338 |
| 7,088,705 B2 * | 8/2006 | Curry | H04W 84/16 370/352 |
| 7,218,919 B2 * | 5/2007 | Vaananen | H04W 4/24 379/88.13 |
| 7,668,155 B2 * | 2/2010 | Omori | H04M 1/2535 370/352 |
| 7,724,711 B2 * | 5/2010 | Haumont | H04L 67/14 370/338 |
| 7,831,430 B2 * | 11/2010 | Dodrill | H04L 67/34 704/270.1 |
| 7,890,086 B2 * | 2/2011 | Lee | H04M 3/53366 370/352 |
| 8,099,283 B2 * | 1/2012 | Dodrill | H04L 67/34 704/270 |
| 8,326,632 B2 * | 12/2012 | Dodrill | H04L 67/34 704/270 |
| 8,442,506 B2 * | 5/2013 | Peacock | H04W 92/02 370/260 |
| 9,178,978 B2 * | 11/2015 | Park | H04M 1/72536 |

FOREIGN PATENT DOCUMENTS

| JP | 2005 341010 A | 12/2005 |
| JP | 2006-268672 A | 10/2006 |
| JP | 2007-148886 A | 6/2007 |

* cited by examiner

Primary Examiner — Susan McFadden
(74) Attorney, Agent, or Firm — Birch, Stewart, Kolasch & Birch, LLP

(57) ABSTRACT

A speech server (SS) managing one or a plurality of pieces of speech terminal-specifying information (STSI) and user-specifying information (USI), each of pieces of STSI allowing a corresponding one of one or a plurality of speech terminals to be specified, USI being of a user who is capable of causing the corresponding one of the one or a plurality of speech terminals to output speech. The SS receives USI and transmit the one or a plurality of pieces of STSI associated with USI. The SS receives (i) STSI selected from the one or a plurality of pieces of STSI transmitted and (ii) speech information indicative of speech content to be outputted as speech. The SS instructs a speech terminal to output the speech content as speech, the speech terminal being identified among the one or a plurality of speech terminals by STSI received.

11 Claims, 8 Drawing Sheets

SPEECH SERVER MANAGING ONE OR A PLURALITY OF PIECES OF SPEECH TERMINAL-SPECIFYING INFORMATION AND USER-SPECIFYING INFORMATION

CROSS-REFERENCE TO RELATED APPLICATIONS

This Nonprovisional application claims priority under 35 U.S.C. §119 on Patent Application No. 2013-200448 filed in Japan on Sep. 26, 2013, the entire contents of which are hereby incorporated by reference.

TECHNICAL FIELD

The present invention relates to a speech server which instructs a terminal to output speech, a speech method, a recording medium, a speech system including the speech server, a speech terminal which outputs speech, and a mobile terminal used in the speech system.

BACKGROUND ART

Services for communicating with a specific person in a virtual space constituted by an electrical communication network such as the Internet have come into wide use in recent years. An example of the services is an electronic message board. For example, Patent Literature 1 below describes an information message board for household use which, on the basis of a key word automatically extracted in accordance with how the user uses content, further collects content.

Usually, each of the members who use an electronic message board can post information, such as a message, to the electronic message board, and the other members can share the posted information by viewing the electronic message board. For example, in a case where a member wants to notify information to another member to be notified, the member can post the information on the electronic message board so that (i) the information can be communicated to the another member to be notified and (ii) other members can also check the information. This makes it possible to avoid such circumstances where a plurality of members redundantly notify the same information to the member to be notified, or where none of the other members notifies the information to the member to be notified, on the assumption that some other member will notify the information to the member to be notified.

CITATION LIST

Patent Literature

[Patent Literature 1] Japanese Patent Application Publication, Tokukai, No. 2007-148886 A (Publication Date: Jun. 14, 2007)

SUMMARY OF INVENTION

Technical Problem

In a case where the electronic message board is used, there can be a situation where a member cannot immediately check the information posted on the electronic message board. Examples of such a situation include a case where the user is busy cooking, a case where the user cannot use a mobile information terminal immediately because the battery of the mobile information terminal is being charged, a case where the user is unaware that the information has been posted on the electronic message board, and other cases.

On the other hand, in a case where the electronic message board is not used, there can be such problems as (i) a plurality of members redundantly notify a certain member of the same information, (ii) none of the members notifies the certain member on the assumption that some other member will notify the certain member, and (iii) the like.

In order to solve the problems, the applicant has filed an application (Japanese Patent Application, Tokugan, No. 2013-176063 (Filing Date: Aug. 27, 2013)) related to a server, a notification method, a notification system, and a program which, regardless of whether or not a person to be notified is using an electronic message board, (i) can cause a controlled device (speech terminal) to notify (output speech to) the person and (ii) allows a member who is using the electronic message board to know a notification (speech) to the person to be notified.

The inventors of the subject application have found that the invention described in the application above would become further user friendly if it becomes possible that (i) a service (application) which generates an instruction for causing the speech terminal to output speech is not limited and (ii) an external server which provides another service (application) can also generate an instruction for causing the speech terminal to output speech.

The present invention is made on the basis of the above knowledge. An object of the present invention is to provide a speech server, a speech method, and a program which enable to generate, from an external server which provides another service, an instruction for causing a speech terminal associated with a specific user to output speech.

Solution to Problem

In order to attain the object, a speech server in accordance with one aspect of the present invention is a speech server including: a speech terminal-specifying information management unit configured to manage speech terminal-specifying information which allows a speech terminal to be specified; a reception unit configured to receive, from an external server, (i) the speech terminal-specifying information or user-specifying information and (ii) speech information indicative of speech content to be outputted as speech; and a speech instruction unit configured to instruct the speech terminal to output the speech content as speech, the speech terminal being identified by (i) the speech terminal-specifying information received from the external server or (ii) the speech terminal-specifying information associated with the user-specifying information received from the external server.

In order to attain the object, a speech method in accordance with one aspect of the present invention is a speech method including the steps of: managing speech terminal-specifying information which allows a speech terminal to be specified; receiving, from an external server, (i) the speech terminal-specifying information or user-specifying information and (ii) speech information indicative of speech content to be outputted as speech; and instructing the speech terminal to output the speech content as speech, the speech terminal being identified by (i) the speech terminal-specifying information received from the external server or (ii) the speech terminal-specifying information associated with the user-specifying information received from the external server.

In order to attain the object, a speech system in accordance with one aspect of the present invention is a speech system including: a speech server; and a speech terminal, the speech server including: a speech terminal-specifying information management unit configured to manage speech terminal-specifying information which allows a speech terminal to be specified; a reception unit configured to receive, from an external server, (i) the speech terminal-specifying information or user-specifying information and (ii) speech information indicative of speech content to be outputted as speech; and a speech instruction unit configured to instruct the speech terminal to output the speech content as speech, the speech terminal being identified by (i) the speech terminal-specifying information received from the external server or (ii) the speech terminal-specifying information associated with the user-specifying information received from the external server, the speech terminal including a control unit configured to control a speaker to output the speech content as speech in accordance with an instruction from the speech server to output the speech content as speech.

In order to attain the object, a speech terminal in accordance with one aspect of the present invention is a speech terminal including a control unit configured to control a speaker to output speech content as speech in accordance with an instruction from a speech server to output the speech content as speech, the speech terminal being specified by (i) speech terminal-specifying information which the speech server receives from an external server and which allows the speech terminal to be identified or (ii) the speech terminal-specifying information associated with user-specifying information which the speech server receives from the external server.

In order to attain the object, a speech system in accordance with one aspect of the present invention is a speech system including: a mobile terminal; an external server; a speech server; and a speech terminal, the mobile terminal including a mobile terminal transmission unit configured to transmit, to the external server, (i) speech terminal-specifying information which allows the speech terminal to be specified, or user-specifying information and (ii) speech information indicative of speech content to be outputted from the speech terminal as speech, the external server including: an external server reception unit configured to receive, from the mobile terminal, (i) the speech terminal-specifying information or the user-specifying information and (ii) the speech information; and an external server transmission unit configured to transmit (i) the speech terminal-specifying information or the user-specifying information and (ii) the speech information each received by the external server reception unit, the speech server including: a speech terminal-specifying information management unit configured to manage the speech terminal-specifying information; speech server reception unit configured to receive, from the external server, (i) the speech terminal-specifying information or the user-specifying information and (ii) the speech information; and a speech instruction unit configured to instruct the speech terminal to output the speech content as speech, the speech terminal being identified by (i) the speech terminal-specifying information received by the speech server reception unit or (ii) the speech terminal-specifying information associated with the user-specifying information received by the speech server reception unit, the speech terminal including a control unit configured to control a speaker to output the speech content as speech in accordance with an instruction from the speech server to output the speech content as speech.

In order to attain the object, a mobile terminal in accordance with one aspect of the present invention is a mobile terminal including a transmission unit configured to transmit, to a speech server via an external server, (i) speech terminal-specifying information or user-specifying information and (ii) speech information indicative of speech content, the speech server (i) managing the speech terminal-specifying information which allows a speech terminal to be identified and (ii) instructing the speech terminal to output the speech content as speech, the speech terminal being specified by (a) the speech terminal-specifying information or (b) the speech terminal-specifying information associated with user-specifying information.

The speech server in accordance with the forgoing aspects of the present invention may be realized by a computer. In this case, the present invention encompasses a computer-readable non-transitory recording medium that stores a program which causes a computer to operate as each of the units of the speech server so that the speech server can be realized by the computer.

Advantageous Effects of Invention

According to one aspect of the present invention, it is possible to provide a speech server, a speech method and a program which enable to generate, from an external server which generates another service, for causing a speech terminal associated with a specific user to output speech.

DESCRIPTION OF EMBODIMENTS

Embodiment 1

Figure 1:
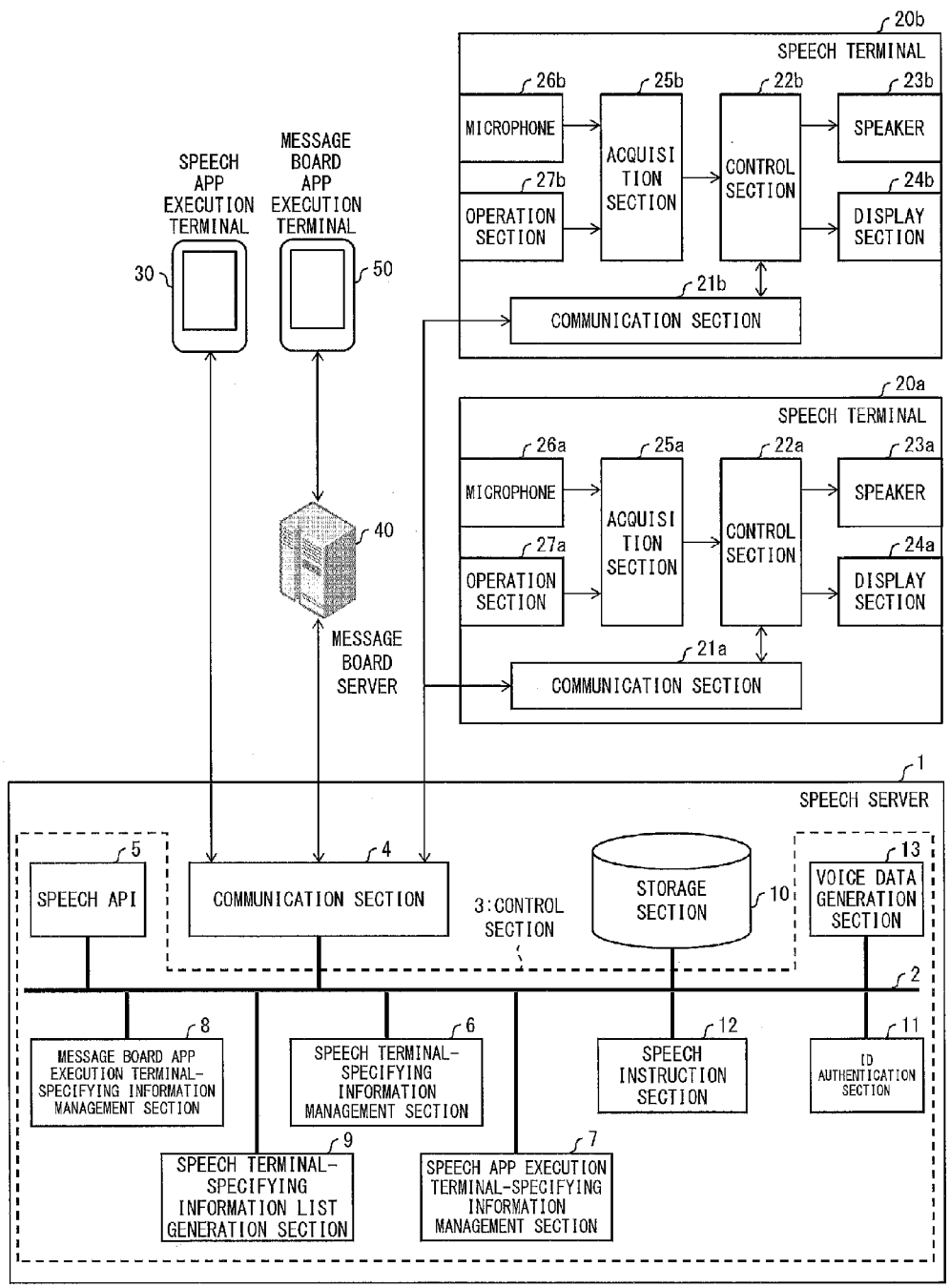
FIG. 1 is a block diagram schematically illustrating a speech server in accordance with Embodiment 1 of the present invention.
Figure 2:
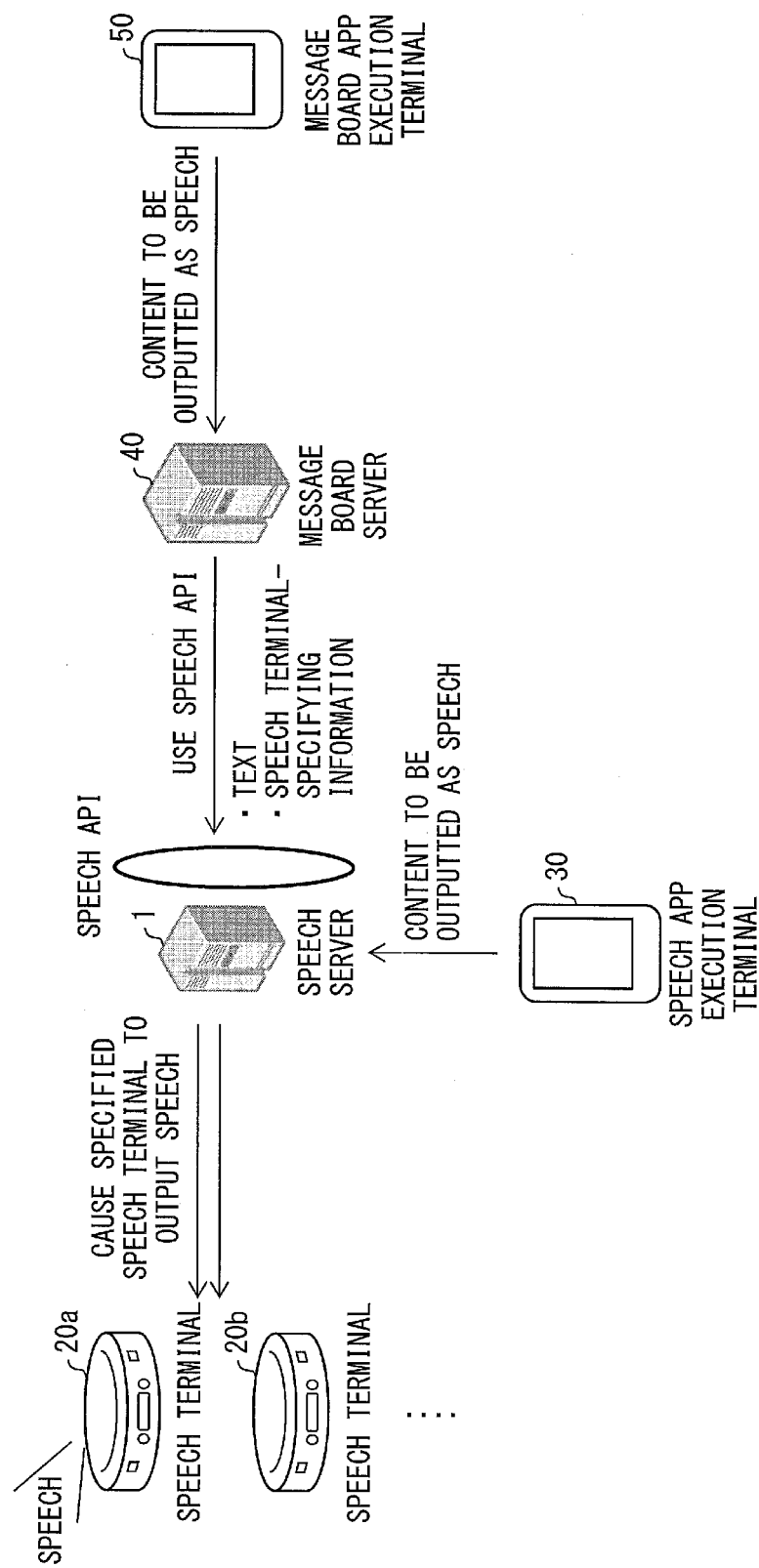
FIG. 2 is a view schematically illustrating a speech service provided by a speech server in accordance with Embodiment 1 of the present invention.
Figure 7:
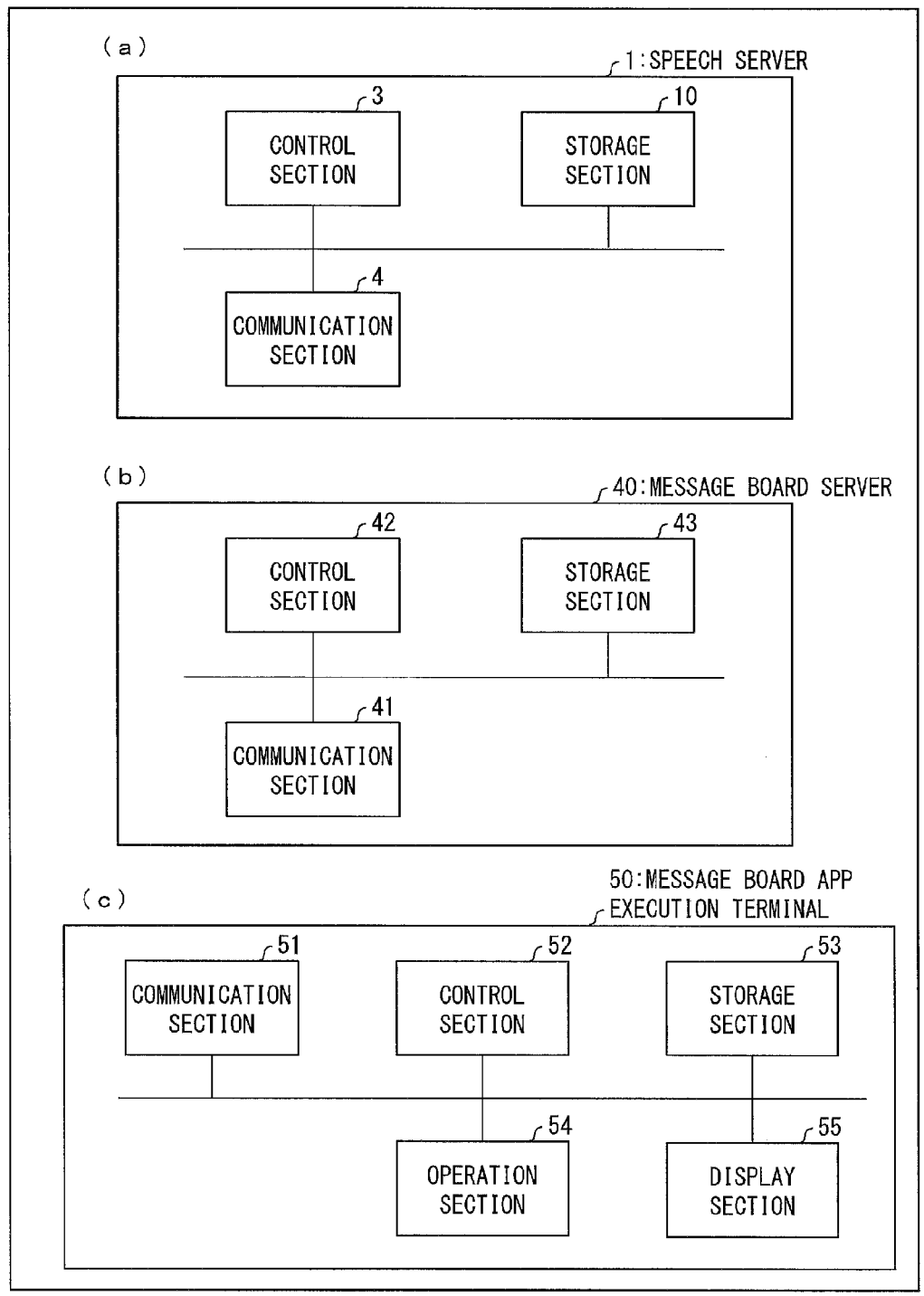
FIG. 7 shows views illustrating hardware arrangements of a speech server, a message board server, and a message board app execution terminal in accordance with Embodiment 1 of the present invention.
Figure 8:
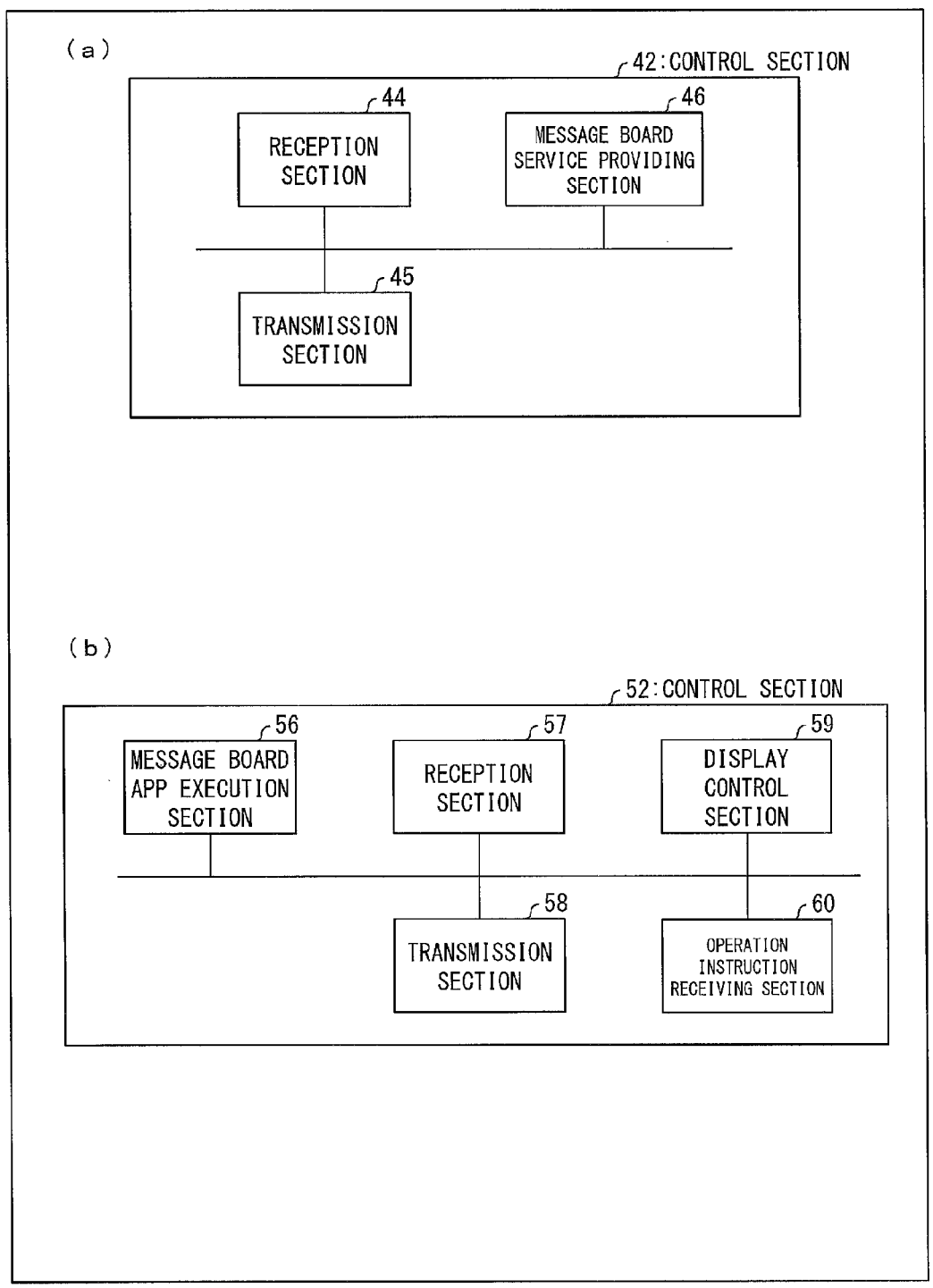
FIG. 8 shows functional block diagrams illustrating arrangements of a control section of a message board server and a control section of a message board app execution terminal in accordance with Embodiment 1 of the present invention.

The following description will discuss, with reference to FIGS. 1 through 4, 7, and 8, details of a speech server 1 in accordance with the present embodiment. FIG. 1 is a block diagram schematically illustrating the speech server 1. FIG. 2 is a view schematically illustrating a speech service provided by the speech server 1. FIG. 7 shows views illustrating hardware arrangements of the speech server 1, a message board server 40, and a message board app execution terminal 50. FIG. 8 shows functional block diagrams illustrating arrangements of a control section 42 of the message board server 40 and a control section 52 of the message board app execution terminal 50.

(General Description of Speech Service)

As illustrated in FIG. 2, the speech server 1 is a server which provides a speech service. Note, here, that the speech service is a service which (i) receives, from a speech app execution terminal 30 typified by a smart phone, an instruction including content to be outputted as speech and (ii) causes at least one of speech terminals 20a and 20b, which belong to the same group as the speech app execution terminal 30, to produce a voice based on the content to be outputted as speech. Note that in a case where it is unnecessary to distinguish between the speech terminals 20a and 20b, the at least one of the speech terminals 20a and 20b will simply be referred to as 'speech terminal 20'. A system which includes the server providing the speech service and the terminals will be referred to as a speech system.

In the terminal which transmits an instruction to the speech server 1, an application for communicating with the speech server 1 so as to provide the speech service is installed in advance. In the present embodiment, the application is referred to as 'speech application', or 'speech app' for short. Accordingly, in the present embodiment, the terminal which transmits the instruction to the speech server is referred to as the speech app execution terminal 30. When a user inputs content to be outputted as speech into the speech app execution terminal 30, the speech app execution terminal 30 generates an instruction which includes the content to be outputted as speech, and transmits the instruction to the speech server 1.

In the speech service, various terminals using the service, such as the speech app execution terminal 30 and the speech terminal 20, are registered by groups in advance in the speech server. For example, various terminals used by a family are registered such that the various terminals are associated with a single group (may also be referred to as a home group). In the following description, terminals which are registered such that the terminals are associated with a home group may also be expressed as terminals belonging to the home group. In the speech service, a speech terminal 20 which the speech server 1 can cause to output speech in response to the instruction from the speech app execution terminal 30 is limited to one that belongs to a home group.

As described above, the speech service is configured to register therein various terminals such that the various terminals are associated with a home group. As such, the speech server 1 can specify a speech terminal to be caused to output speech, on the basis of the instruction including the content to be outputted as speech.

(Use from External Server)

The speech server 1 can receive, apart from the instruction received from the speech app execution terminal 30, an instruction from an external server and cause a specific speech terminal to output speech. A service provided by an external server 40 is not limited, but the present embodiment describes the external server 40 as one that provides a message board service. Accordingly, the external server 40 is also referred to as the message board server 40.

As illustrated in FIG. 2, the message board server 40 receives, from the message board app execution terminal (mobile terminal) 50, an instruction including at least content to be outputted from the speech terminal 20 as speech. The message board app execution terminal 50 is a terminal in which an application for communicating with the message board server 40 so as to provide the message board service is installed in advance. In the present embodiment, the application is referred to as 'message board application', or 'message board app' for short. When a user inputs content to be outputted as speech into the message board app execution terminal 50, the message board app execution terminal 50 generates an instruction including the content to be outputted as speech, and transmits the instruction to the message board server 40.

The speech server 1 has an application program interface (API, Application Programming Interface) which the speech server 1 makes open to the public so that an external server can also easily use the speech service provided by the speech server 1. In the present embodiment, an API which is made open to the public by the speech server 1 is referred to as a speech API. Through the speech API, the message board server 40 can transmit to the speech server 1 the instruction received from the message board app execution terminal 50 and containing the content to be outputted as speech. On the basis of the instruction received from the message board server 40 and containing the content to be outputted as speech, the speech server 1 causes the speech terminal 20 to output, as speech, the content to be outputted as speech.

As described above, the speech server 1 can receive an instruction from the speech app execution terminal 30 which is executing the speech app. In addition, through the speech API, the speech server 1 can receive an instruction from the message board app execution terminal 50 which is executing the message board app. This allows the speech server 1 to (i) receive instructions generated by various applications and including content to be outputted as speech and (ii) generate an instruction for causing a speech terminal used by a specific user to output speech. Note that details of a sequence of the speech service provided by the speech server 1 will be described later with reference to FIGS. 3 and 4.

(Arrangement of Speech Terminal)

In the present embodiment, the speech terminals 20a and 20b will each be described as a robot vacuum cleaner. However, the speech terminal 20 can be any terminal that is capable of receiving an instruction from the speech server 1 and outputting speech in accordance with the instruction. Specifically, the speech terminal 20 can be a household electric appliance connected to a network, or a mobile terminal typified by a smart phone and a tablet terminal. Further, the speech terminal 2Q can be a stationary terminal connectable to a network, such as a TV or a personal computer.

The following description will discuss, with reference to FIG. 1, an arrangement of the speech terminal 20a as an example of speech terminal. The speech terminal 20a includes, in addition to an arrangement for serving as a vacuum cleaner (not shown), a communication section 21a, a control section (control unit) 22a, a speaker 23a, a display section 24a, an acquisition section 25a, a microphone 26a, and an operation section 27a.

The communication section 21a carries out wireless communications with the speech server 1 via a network such as the Internet. The communication section 21a receives an instruction transmitted from the speech server 1, and supplies the instruction to the control section 22a. Further, the communication section 21a transmits, to the speech server 1, a speech completion notification or the like. The speech completion notification notifies that a speech has been completed on the basis of an instruction received from the speech server 1 and concerning speech.

The control section 22a exercises general control over sections of the speech terminal 20a. Further, on the basis of the instruction received from the speech server 1 and concerning speech, the control section 22a reproduces speech voice data that is included in the instruction, and causes the speaker 23a to output a voice thus reproduced.

The speaker 23a produces the voice reproduced by the control section (outputs speech), as described above.

The display section 24a notifies the user of information such as a status of the speech terminal 20a by displaying the information. The display section 24a can also be configured to display a text representing content of a speech.

The microphone 26a and the operation section 27a are each a user interface for receiving an input from the user. The microphone 26a obtains a voice uttered by the user, and supplies, to the control section 22a, voice data representing the voice thus obtained.

The operation section 27a supplies, to the control section 22a, a user instruction inputted by the user. Note that the operation section 27a is not limited to any particular form, and can be provided as a button for selecting an operation (function) to be carried out by the speech terminal 20a, or as a touch panel. For example, in a case where the user presses a button, included in the operation section 27a, for inputting an instruction to carry out a vacuum cleaning operation, the speech terminal 20a can carry out the vacuum cleaning operation.

Note that the speech terminal 20b has the same arrangement as that of the speech terminal 20a. As such, descriptions on the speech terminal 20b will not be given in the Description.

(Speech App Execution Terminal and Message Board App Execution Terminal)

In the present embodiment, the speech app execution terminal 30 is a mobile terminal in which the speech app is installed. Via the speech app execution terminal 30 which is executing the speech app, a user specifies a speech terminal 20 to be caused to output speech and inputs content to be outputted as speech. In this way, the user can cause the specified speech terminal 20 to output the inputted content as speech. In other words, the user can use the speech service. The following description will be given on the assumption that the speech app is being executed on the speech app execution terminal 30 when the user uses the speech service.

Further, in the present embodiment, the message board app execution terminal 50 is a mobile terminal in which the message board app is installed. Via the message board app execution terminal 50 which is executing the message board app, a user specifies a speech terminal to be caused to output speech and inputs content to be outputted as speech. In this way, the user can cause the specified speech terminal 20 to output the inputted content as speech. In other words, the user can use the speech service. The following description will be given on the assumption that the message board app is being executed on the message board app execution terminal 50 when the user uses the speech service via the message board service.

As illustrated in (c) of FIG. 7, the message board app execution terminal 50 includes a communication section 51, the control section 52, a storage section 53, an operation section 54, and a display section 55. The communication section 51 is a communication interface provided in order to carry out IP communications with other devices (such as the message board server 40). The control section 52 is a CPU, and realizes functions (described later in detail) of the message board app execution terminal 50 by executing various programs stored in the storage section 53. In other words, the control section 52 controls an operation of the entire message board app execution terminal 50. The storage section 53 is a recording medium in which the various programs are stored. In the present embodiment, the storage section 53 can be realized in the form of a hard disk drive, but can be other types of devices. The operation section 54 is a device which receives a user instruction inputted by the user, and is realized in the form of a button, a switch, a touch panel, or the like. The display section 55 is a device which displays an image represented by an image signal outputted from the control section, and can be realized in the form of a transmissive liquid crystal panel provided with a backlight device, an organic EL display, or the like.

As illustrated in (b) of FIG. 8, the control section 52 of the message board app execution terminal 50 functions also as a message board app execution section 56, a reception section 57, a transmission section (mobile terminal transmission unit, transmission unit) 58, a display control section 59, and an operation instruction receiving section 60. The message board app execution section 56 executes the message board app described above. The reception section 57 receives, via the communication section 51, message board app execution terminal-specifying information and user-specifying information, each of which will be described later. The transmission section 58 transmits, via the communication section 51, user-specifying information and speech terminal-specifying information request, each of which will be described later. The display control section 59 outputs an image signal which represents an image to be displayed on the display section 55. The operation instruction receiving section 60 outputs an instruction signal which represents the user instruction inputted to the operation section 54.

Each of the speech app execution terminal 30 and the message board app execution terminal 50 is not limited to a mobile terminal, and can be a stationary terminal provided that the stationary terminal is capable of executing the speech app or the message board app.

Further, in order to clarify the app executed on the terminal (in order to clarify whether the user is using the speech server or the message board server), the description below distinguishes between the speech app execution terminal 30 and the message board app execution terminal 50. However, the speech app execution terminal 30 and the message board app execution terminal 50 can be the same terminal that is used by the same user.

(Message Board Server 40)

As illustrated in (b) of FIG. 7, the message board server 40 includes a communication section 41, the control section 42, and a storage section 43. The communication section 41 is a communication interface which is provided in order to carry out IP communications with other devices (such as the speech server 1). The control section 42 is a CPU, and realizes functions (described later in detail) of the message board server 40 by executing various programs stores in the storage section 43. In other words, the control section 42 controls an operation of the entire message board server 40. The storage section 43 is a recording medium in which the various programs are stored. In the present embodiment, the drive, but can be other types of devices.

As illustrated in (a) of FIG. 8, the control section 42 of the message board server 40 functions also as a reception section (external server reception unit) 44, a transmission section (external server transmission unit) 45, and a message board service providing section 46. The reception section 44 receives, via the communication section 41, message board app execution terminal-specifying information, user-specifying information, and the like, each of which will be described later. The transmission section 45 transmits, via the communication section 41, user-specifying information and speech terminal-specifying information request, each of which will be described later. The message board service providing section 46 executes an application for providing the message board service.

(Arrangement of Speech Server 1)

As illustrated in (a) of FIG. 7, the speech server 1 includes a control section 3, a communication section 4, and a storage section 10. More specifically, as illustrated in FIG. 1, the control section 3 of the speech server 1 includes a speech API 5, a speech terminal-specifying information management section 6, a speech app execution terminal-specifying information management section 7, a message board app execution terminal-specifying information management section 8, a speech terminal-specifying information list generation section 9, an ID authentication section 11, a speech instruction section 12, and a voice data generation section 13, which are connected to one another via a bus 2.

The control section 3 exercises general control over sections of the speech server 1. The control section 3 is a CPU, and realizes functions (described later in detail) of the speech server 1 by executing various programs stored in the storage section 10.

The communication section 4 carries out wireless communications with the speech terminal 20, the speech app execution terminal 30, and the message board server 40 via a network such as the Internet or a LAN. In other words, the communication section 4 is a communication interface which is provided in order to carry out IP communications with other devices (such as the message board server 40).

The speech API 5, which is a reception unit as well as a speech server reception unit, is an API for allowing the speech service provided by the speech server 1 to be easily used also by an external server. The speech API 5 can be arranged such that a function of the speech API 5 is realized by execution of a program by the control section 3.

Further, as illustrated in FIG. 1, it is possible to employ an arrangement in which the control section 3 functions as the speech terminal-specifying information management section 6, the speech app execution terminal-specifying information management section 7, the message board app execution terminal-specifying information management section 8, the speech terminal-specifying information list generation section 9, the ID authentication section 11, the speech instruction section 12 and the voice data generation section 13.

The speech API 5 can be regarded also as means for converting various pieces of information received from the message board server 40, such as speech terminal-specifying information or speech content to be outputted as speech, into a form that can be processed by the speech server 1. Via the speech API 5, the speech server 1 can execute an instruction received from the message board server 40. Accordingly, on the basis of an instruction received from the message board server 40 and including content to be outputted as speech, the speech server 1 can cause the speech terminal 20 to output, as speech, the content to be outputted as speech.

(Speech Terminal-Specifying Information Management Section 6)

When the speech terminal-specifying information management section 6, which is a speech terminal-specifying information management unit, receives from the speech terminal 20a a request for generation of speech terminal-specifying information, the speech terminal-specifying information management section 6 generates and manages speech terminal-specifying information that specifies the speech terminal 20a. The present embodiment describes the speech terminal-specifying information as one that is generated by the speech terminal-specifying information management section 6 in accordance with a predetermined rule.

Another aspect of the speech terminal-specifying information can be a MAC address (Media Access Control address) allocated to the communication section 21a of the speech terminal 20a in advance, or a serial number allocated to the speech terminal 20a when the speech terminal 20a is manufactured. In a case where a MAC address or a serial number is used as the speech terminal-specifying information, a request, transmitted by the speech terminal 20a, for management of speech terminal-specifying information includes a MAC address or a serial number of the speech terminal 20a. The speech terminal-specifying information management section 6 generates and manages speech terminal-specifying information of the speech terminal 20a on the basis of the MAC address or the serial number of the speech terminal 20a included in the request for management of speech terminal-specifying information.

The speech terminal-specifying information is stored in the storage section 10 such that the speech terminal-specifying information is associated with speech app execution terminal-specifying information, message board app execution terminal-specifying information, and user-specifying information, each of which will be described later.

(Speech App Execution Terminal-Specifying Information Management Section 7)

Upon reception of a request from the speech app execution terminal 30, the speech app execution terminal-specifying information management section 7, which is a speech app execution terminal-specifying information management unit, generates and manages speech app execution terminal-specifying information that specifies the speech app execution terminal 30. The present embodiment describes the speech app execution terminal-specifying information as one that is generated by the speech app execution terminal-specifying information management section 7 in accordance with a predetermined rule.

Another aspect of the speech app execution terminal-specifying information can be a MAC address or a serial number which are allocated to the speech app execution terminal 30 in advance. In a case where a MAC address or a serial number is used as the speech app execution terminal-specifying information, the request transmitted by the speech app execution terminal 30 for speech app execution terminal-specifying information includes a MAC address or a serial number of the speech app execution terminal 30. The speech app execution terminal-specifying information management section 7 generates and manages speech app execution terminal-specifying information of the speech app execution terminal 30 on the basis of the MAC address or the serial number of the speech app execution terminal 30 included in the request for the speech app execution terminal-specifying information.

The speech app execution terminal-specifying information is stored in the storage section 10 such that the speech app execution terminal-specifying information is associated with speech terminal-specifying information, message board app execution terminal-specifying information, and user-specifying information. The message board app execution terminal-specifying information and the user-specifying information will be described later.

(Message Board App Execution Terminal-Specifying Information Management Section 8)

Upon reception of a request from the message board app execution terminal 50, the message board app execution terminal-specifying information management section 8, which is a message board app execution terminal-specifying information management unit, generates and manages message board app execution terminal-specifying information that specifies the message board app execution terminal 50. The present embodiment describes the message board app execution terminal-specifying information as one that is generated by the message board app execution terminal-specifying information management section 8 in accordance with a predetermined rule.

Another aspect of the message board app execution terminal-specifying information can be a MAC address or a serial number which are allocated to the message board app execution terminal 50 in advance. In a case where a MAC address or a serial number is used as the message board app execution terminal-specifying information, the request transmitted by the message board app execution terminal 50 for message board app execution terminal-specifying information includes a MAC address or a serial number of the message board app execution terminal 50. The message board app execution terminal-specifying information management section 8 generates and manages message board app execution terminal-specifying information of the message board app execution terminal 50 on the basis of the MAC address or the serial number of the message board app execution terminal 50 included in the request for message board app execution terminal-specifying information.

The message board app execution terminal-specifying information is stored in the storage section 10 such that the message board app execution terminal-specifying information is associated with speech terminal-specifying information, speech app execution terminal-specifying information, and user-specifying information. The user-specifying information will be described later.

(User ID and User-Specifying Information)

In order to use the speech service, the user registers personal information which is a requirement predetermined by the service. The personal information includes a password for using the speech service. The speech server 1 gives a user ID (account) to the user who has registered prescribed personal information. In general, a user ID is an email address or a nickname of the user, a character string issued by the service, or the like.

When the user uses the speech service, the user transmits the user ID and the password to the speech server 1. The ID authentication section 11 of the speech server 1 determines whether or not the user ID and the password received are registered in the speech service, and authenticates (personal authentication) the user if the user ID and the password are registered. Note that in the following description, the user ID and the password may also be referred to as log-in information, collectively.

The user uses the log-in information for the speech service also when the user uses the speech service via the message board service. When the ID authentication section 11 of the speech server 1 receives the user's request for authentication via the message board server 40, the ID authentication section 11 determines whether or not the log-in information received is registered in the speech service, and authenticates the user if the log-in information is registered.

At this time, the speech server 1 transmits, to the message board server 40, user-specifying information as information which indicates that the user has been authenticated. The user-specifying information is information that is unique to the log-in information transmitted by the user, and can be, for example, the user ID itself. Alternatively, the user-specifying information can be generated by the ID authentication section 11 in accordance with a predetermined rule. The present embodiment describes the user-specifying information as one that is identical to the user ID.

(Storage Section 10)

As described above, the storage section 10 is storage means in which speech terminal-specifying information, speech app execution terminal-specifying information, message board app execution terminal-specifying information, and user-specifying information are stored such that these pieces of specifying information are associated with one another. Each of the pieces of specifying information will be described later in detail with reference to FIGS. 3 and 4. Further, the storage section 10 is a recording medium in which various programs executed by the control section 3 are stored. The storage section 10 can be realized in the form of a hard disk drive, but can be other types of devices.

(Speech Instruction Section 12 and Voice Data Generation Section 13)

The speech instruction section 12, which is a speech instruction unit, instructs the voice data generation section 13 to synthesize, on the basis of an instruction received from the message board server 40 and including content to be outputted as speech, voice data that represents the content to be outputted as speech.

On the basis of the instruction including the content to be outputted as speech, the voice data generation section 13, which is a voice data generation unit, synthesizes speech voice data that represents the content to be outputted as speech.

The speech instruction section 12 generates a speech instruction for causing the synthesized speech voice data to be outputted as speech (to be reproduced).

(Sequence of Speech Service)

Figure 3:
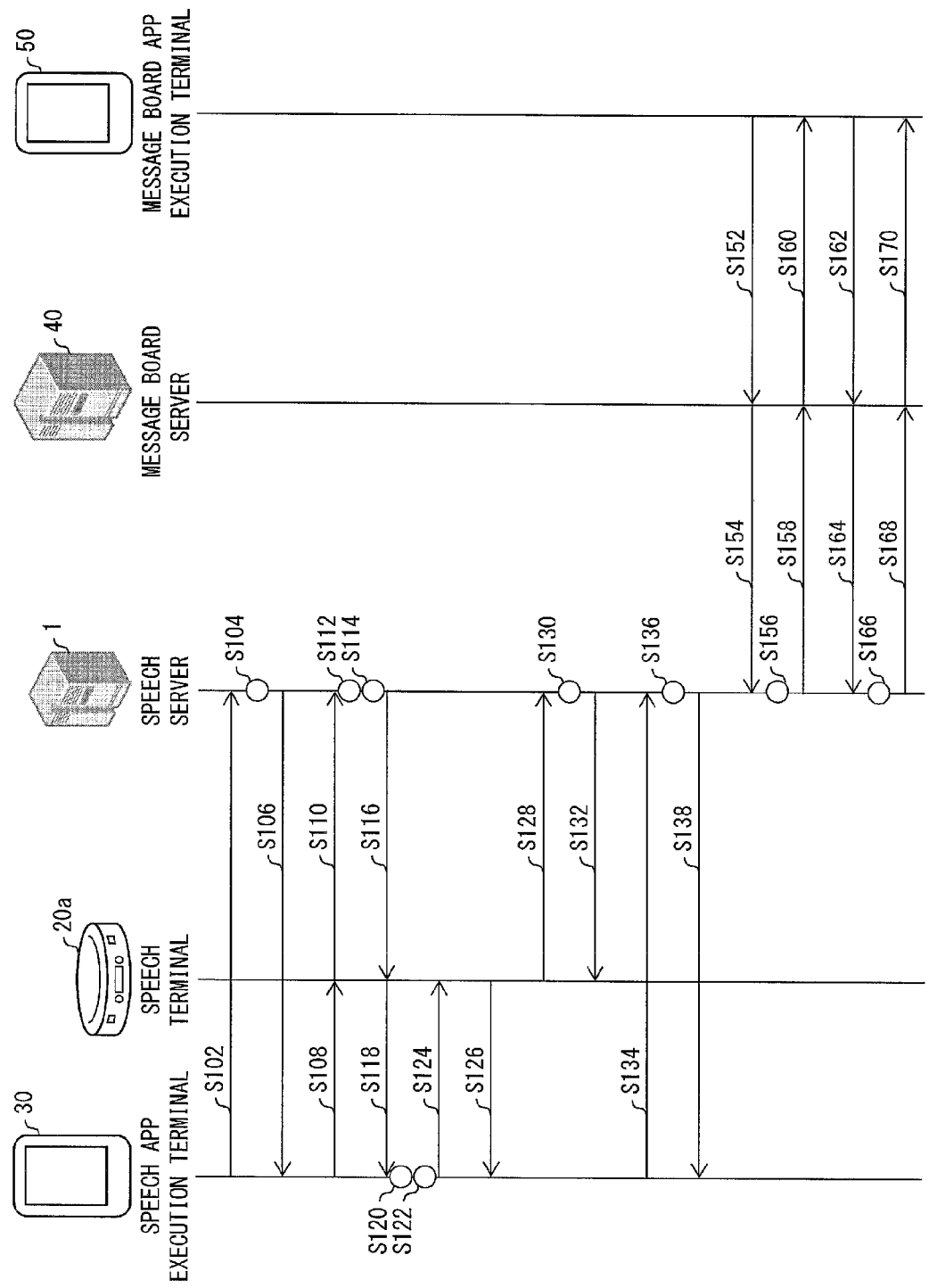
FIG. 3 is a sequence diagram showing a flow of data processing carried out in a speech service provided by a speech server in accordance with Embodiment 1 of the present invention.
Figure 4:
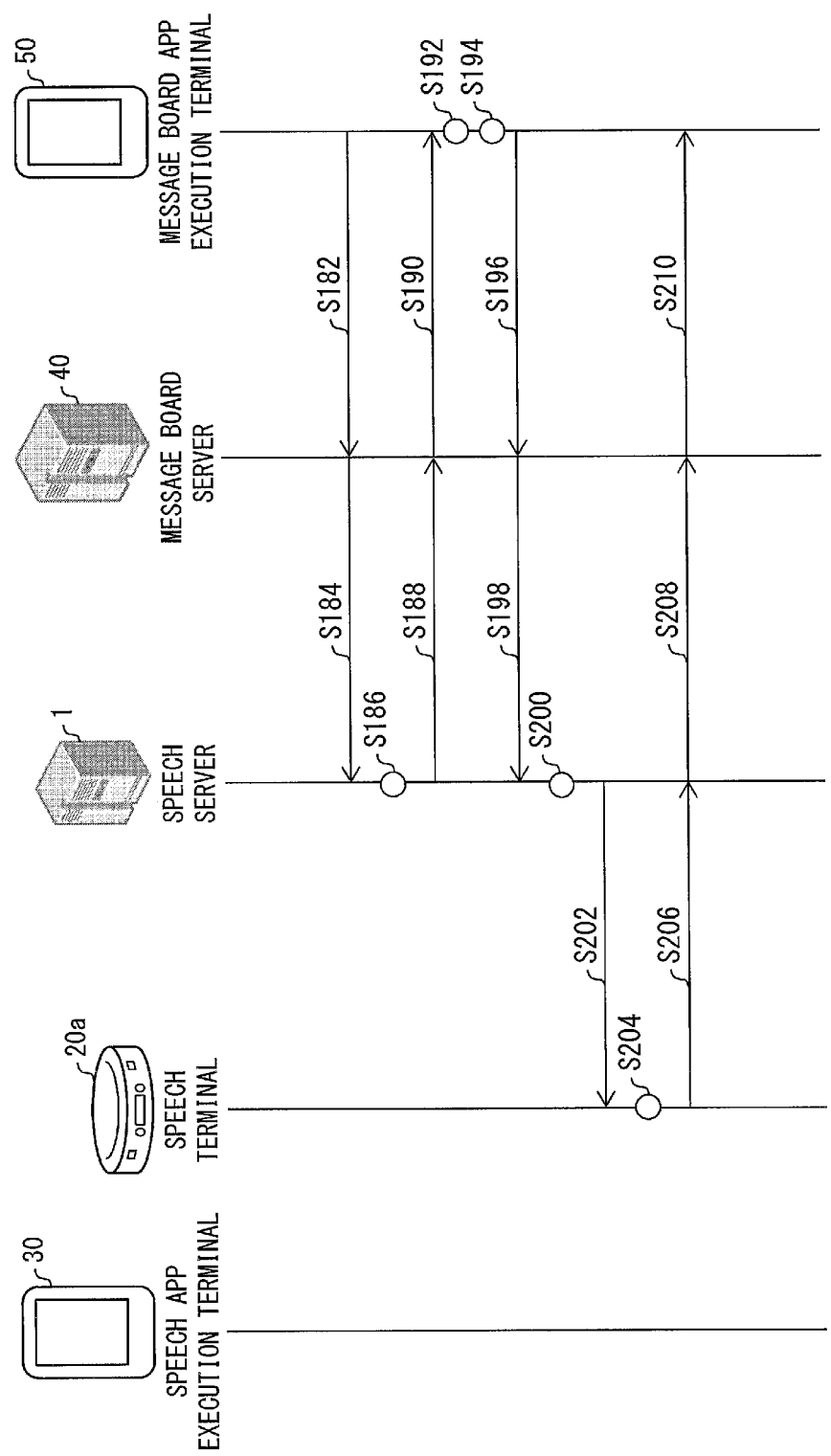
FIG. 4 is a sequence diagram showing a flow of data processing carried out in a speech service provided by a speech server in accordance with Embodiment 1 of the present invention.

The following description will discuss, with reference to FIGS. 3 and 4, a flow of data processing carried out in the speech service provided by the speech server 1. FIGS. 3 and 4 are sequence diagrams showing a flow of the data processing carried out in the speech service provided by the speech server 1. FIG. 3 shows a first half of the data processing carried out in the speech service, and FIG. 4 shows a latter half of the data processing carried out in the speech service.

(Registration of Speech Terminal 20a and Speech App Execution Terminal 30)

Step S102: The speech app execution terminal 30 transmits, to the speech server 1, a notification of an intention to use the speech service.

Step S104: The speech app execution terminal-specifying information management section 7 of the speech server 1 generates speech app execution terminal-specifying information that specifies the speech app execution terminal 30, and stores the speech app execution terminal-specifying information in the storage section 10.

Step S106: The speech server 1 transmits the speech app execution terminal-specifying information to the speech app execution terminal 30.

Step S108: The speech app execution terminal 30 transmits the received speech app execution terminal-specifying information to the speech terminal 20a.

Step S110: The speech terminal 20a transmits the received speech app execution terminal-specifying information to the speech server 1. Further, the speech terminal 20a requests the speech server 1 to provide the speech terminal-specifying information.

Step S112: The speech terminal-specifying information management section 6 of the speech server 1 generates speech terminal-specifying information that specifies the speech terminal 20a (speech terminal-specifying information management step).

Step S114: The control section 3 (associating unit) of the speech server 1 associates the generated speech terminal-specifying information with the speech app execution terminal-specifying information received from the speech terminal 20a. Further, the control section 3 stores, in the storage section 10, the speech terminal-specifying information and the speech app execution terminal-specifying information which are thus associated with each other.

Step S116: The control section 3 of the speech server 1 transmits the speech terminal-specifying information to the speech terminal 20a via the communication section 4. The speech terminal 20a receives the speech terminal-specifying information from the speech server 1.

Step S118: The speech terminal 20a transmits, to the speech app execution terminal 30, a notification that the speech terminal 20a has obtained the speech terminal-specifying information.

Step S120: The speech app execution terminal 30 receives the notification that the speech terminal 20a has obtained the speech terminal-specifying information. A control section (not shown) of the speech app execution terminal 30 indicates on a display section (not shown) that the speech terminal-specifying information is allocated to the speech terminal 20a. Further, the control section of the speech app execution terminal 30 displays, on the display section, a notification that prompts the user to input a nickname for identifying the speech terminal 20a.

Step S122: The user who uses the speech app execution terminal 30 inputs a nickname for identifying the speech terminal 20a into the speech app execution terminal 30.

Step S124: The speech app execution terminal 30 transmits, to the speech terminal 20a, the nickname inputted by the user.

Step S126: The speech terminal 20a receives the nickname from the speech app execution terminal 30. The speech terminal 20a transmits, to the speech app execution terminal 30, a notification that allows the speech app execution terminal 30 to know that the nickname has been allocated to the speech terminal 20a.

Step S128: The speech terminal 20a transmits the nickname and the speech terminal-specifying information to the speech server 1.

Step S130: The control section 3 of the speech server 1 receives the nickname and the speech terminal-specifying information via the communication section 4. The control section 3 of the speech server 1 stores the nickname in the storage section 10 such that the nickname is associated with the speech terminal-specifying information stored in the storage section 10. Accordingly, the storage section 10 has stored therein the speech app execution terminal-specifying information, the speech terminal-specifying information, and the nickname of the speech terminal such that the speech app execution terminal-specifying information, the speech terminal-specifying information, and the nickname are associated with one another.

Step S132: The control section 3 of the speech server 1 notifies, to the speech terminal 20a via the communication section 4, information that indicates that the speech terminal-specifying information and the nickname are associated with each other.

Step S134: In order to use the speech service, the speech app execution terminal 30 transmits, to the speech server 1, (i) the log-in information (the user ID and the password) given by the speech server 1 in advance and (ii) the speech app execution terminal-specifying information that specifies the speech app execution terminal 30. This is a process for registering, in the speech server 1, the log-in information of the user who uses the speech app execution terminal 30.

Step S136: The ID authentication section 11 of the speech server 1 refers to the storage section 10, and authenticates the received log-in information if the log-in information can be authenticated.

According to the steps above, the control section 3 causes (i) the speech terminal-specifying information, (ii) the nickname of the speech terminal, (iii) the speech app execution terminal-specifying information, and (iv) the user ID given to the user who uses the speech app execution terminal to be stored in the storage section 10 such that the speech terminal-specifying information, the nickname, the speech app execution terminal-specifying information, and the user ID are associated with one another.

Step S138: The speech server 1 transmits, to the speech app execution terminal 30, a result of authentication of the log-in information received from the speech app execution terminal 30.

(Registration of Message Board App Execution Terminal 50)

Step S152: The transmission section 58 of the message board app execution terminal 50 transmits, to the message board server 40, a request to use the speech service via message board service.

Step S154: The reception section 44 of the message board server 40 receives the request from the message board app execution terminal 50, and the transmission section 45 of the message board server 40 transmits a request for message board app execution terminal-specifying information to the speech server 1.

The control section 3 of the speech server 1 receives a command and information from the message board server 40 via the speech API 5. Since the command and the information are received via the speech API 5, the speech service provided by the speech server 1 can easily be used by an external server (for example, the message board server 40) other than the speech server 1. It is well known technology that a server which provides a service makes an API for using the service open to the public. As such, the Description will not discuss details of the speech API 5. Note that in the present embodiment, interactions between the message board server 40 and the speech server 1 are performed via the speech API 5. However, for the sake of simple explanation, descriptions on each sequence diagram will not mention an explanation that the interactions are performed via the speech API 5.

Step S156: The message board app execution terminal-specifying information management section 8 of the speech server 1 generates message board app execution terminal-specifying information, and stores the message board app execution terminal-specifying information in the storage section 10.

Step S158: The speech server 1 transmits the message board app execution terminal-specifying information to the message board server 40.

Step S160: The transmission section 45 of the message board server 40 transmits, to the message board app execution terminal 50, the message board app execution terminal-specifying information which the reception section 44 has received from the speech server 1.

Step S162: In order to use the speech service, the transmission section 58 of the message board app execution terminal 50 transmits, to the message board server 40, (i) a request for authentication of the user ID given by the speech server 1 in advance and (ii) the log-in information (the user ID and the password).

Step S164: The transmission section 45 of the message board server 4Q transmits, to the speech server 1, the request for authentication of the user ID and the log-in information received by the reception section 44.

Step S166: The ID authentication section 11 of the speech server 1 refers to the storage section 10. In a case where the received user ID can be authenticated, the ID authentication section 11 authenticates the received user ID. On the basis of the fact that the terminals (the speech app execution terminal 30 and the message board app execution terminal 50) are associated with the same user ID, the ID authentication section 11 determines that the same user uses both the terminals. When the ID authentication section 11 authenticates the received user ID, the control section 3 allocates, to the user ID, user-specifying information that corresponds to the user ID. The control section 3 causes the message board app execution terminal-specifying information generated in response to the request received from the message board server 40 and the user-specifying information generated by the ID authentication section 11 to be stored in the storage section 10 such that the message board app execution terminal-specifying information and the user-specifying information are associated with the user ID.

Note that the control section 3 may allocate the authenticated user ID itself as the user-specifying information. It is also possible to employ an arrangement in which the control section 3 generates information that can specify the user ID, and treat the information as the user-specifying information. In the present embodiment, the user-specifying information is described as the user ID itself.

Step S168: The speech server 1 transmits, to the message board server 40, (i) a notification that the received user ID has been authenticated and (ii) the user-specifying information associated with the user ID.

Step S170: The transmission section 45 of the message board server 40 transmits the user-specifying information to the message board app execution terminal 50. Through the steps described above, authentication, via the message board app, of the user ID allocated to the user who uses the speech service provided by the speech server 1 is completed.

(Causing Message Board App Execution Terminal 50 to Speak)

Step S182: In order to use the speech service, the transmission section 58 of the message board app execution terminal 50 transmits, to the message board server 40, the user-specifying information which has been given to the user and a speech terminal-specifying information request. The speech terminal-specifying information request requests the speech server 1 to provide the speech terminal-specifying information associated with the user ID authenticated at the Step S166.

Step S184: The transmission section 45 of the message board server 40 transmits, to the speech server 1, the user-specifying information and the speech terminal-specifying information request received by the reception section 57.

Step S186: The speech terminal-specifying information list generation section 9 of the speech server 1 extracts, from among a plurality of pieces of speech terminal-specifying information stored in the storage section 10, (i) the speech terminal-specifying information associated with the received user-specifying information and (ii) the nickname associated with the speech terminal-specifying information, and generates a speech terminal-specifying information list (reception step).

Step S188: The speech server 1 transmits, to the message board server 40, the speech terminal-specifying information list generated by the speech terminal-specifying information list generation section 9.

Step S190: The transmission section 45 of the message board server 40 transmits, to the message board app execution terminal 50, the speech terminal-specifying information list received by the reception section 44.

Step S192: The display control section 59 of the message board app execution terminal 50 causes pieces of speech terminal-specifying information and nicknames, which are included in the speech terminal-specifying information list received by the reception section 57, to be displayed on the display section 55 so that the user can select from the pieces of speech terminal-specifying information and the nicknames.

Step S194: The user selects a speech terminal to be caused to output speech, out of the pieces of speech terminal-specifying information and the nicknames displayed on the display section 55 of the message board app execution terminal 50. Note that the number of speech terminals selected from the speech terminal-specifying information list so as to be caused to output speech can be one (1), or more than one (1). The following description assumes that the user has selected the speech terminal 20a.

Further, the user inputs, into the message board app execution terminal 50, speech information indicative of content to be outputted from the speech terminal 20a as speech. In the present embodiment, the speech information is described as one that is represented by text data. However, the speech information is not limited to the form of text data, and can be represented by voice data inputted by the user by means of voice input.

Step S196: The transmission section 58 of the message board app execution terminal 50 transmits, to the message board server 40, an instruction for causing the speech terminal 20a to output speech, the instruction including (i) the speech terminal-specifying information of the speech terminal 20a selected by the user and (ii) the speech information inputted by the user.

Step S198: The transmission section 45 of the message board server 40 transmits, to the speech server 1, the instruction, received by the reception section 44, for causing the speech terminal 20a to output speech.

Step S200: The control section 3 of the speech server 1 instructs the voice data generation section 13 to generate, on the basis of the content of the speech information included in the instruction for causing the speech terminal 20a to output speech, voice data for causing the speech terminal to output speech (reception step). Upon reception of the instruction, the voice data generation section 13 generates voice data. Note that in a case where the speech information includes the voice data inputted by the user, the control section 3 may use the voice data included in the speech information as voice data for causing the speech terminal to output speech.

Step S202: The control section 3 of the speech server 1 transmits, to the speech terminal 20a which is the selected speech terminal, the generated voice data and a speech instruction for causing the voice data to be outputted as speech (reproduced) (speech instruction step). Or alternatively, the control section 3 transmits, to the speech terminal 20a which is the selected speech terminal, (i) the voice data included in the speech information and (ii) a speech instruction for causing the voice data to be produced as speech (reproduced).

Step S204: In accordance with the received speech instruction, the control section of the speech terminal 20a reproduces the voice data received, and causes a voice thus reproduced to be outputted from the speaker 23a.

Step S206: The speech terminal 20a transmits, to the speech server 1, a speech completion notification which indicates that the voice data has been reproduced in accordance with the speech instruction.

Step S208: The speech instruction section 12 of the speech server 1 transmits, to the message board server 40, the speech completion notification received via the communication section 4.

Step S210: The transmission section 45 of the message board server 40 transmits, to the message board app execution terminal 50, the speech completion notification received by the reception section 44. The display control section 59 of the control section 52 of the message board app execution terminal 50 causes the speech completion notification received by the reception section 57 to be displayed on the display section 55, thereby notifying the user that the speech terminal 20a has completed speech.

According to the speech server 1, it is possible to generate, from the message board server 40 which is an external server providing another service, an instruction for causing the speech terminal 20a associated with the specific user to output speech.

Note that although the present embodiment has described the speech server 1 as one that is constituted by a single server, the functions of the speech server 1 may be realized by a plurality of servers. For example, among the sections constituting the speech server 1, the ID authentication section and the voice data generation section may each be realized by another server.

Modified Example

In a modified example of the speech server 1, user-specifying information can be message board app execution terminal-specifying information. In this case, the control section 3 of the speech server 1 causes the user ID and the message board app execution terminal-specifying information to be stored in the storage section 10 such that the user ID and the message board app execution terminal-specifying information are associated with each other. According to this arrangement, when the control section 3 receives message board app execution terminal-specifying information from the message board server 40, the control section 3 can specify a user ID associated with the received message board app execution terminal-specifying information. This allows the speech terminal-specifying information list generation section 9 to list speech terminals that are associated with the user ID.

Specifically, in Step S162 shown in FIG. 3, the message board app execution terminal 50 transmits, to the message board server 40, the message board app execution terminal-specifying information in addition to the request for authentication of the user ID given by the speech server in advance and the log-in information (the user ID and the password). In Step S164, the message board server 40 transmits, to the speech server 1, the request for authentication of the user ID, the log-in information, and the message board app execution terminal-specifying information thus received.

In Step S166, the ID authentication section 11 authenticates the received user ID if the user ID can be authenticated. At this time, in response to a reply which indicates that the received user ID has been successfully authenticated, the control section 3 regards the message board app execution terminal-specifying information as user-specifying information.

Embodiment 2

Figure 5:
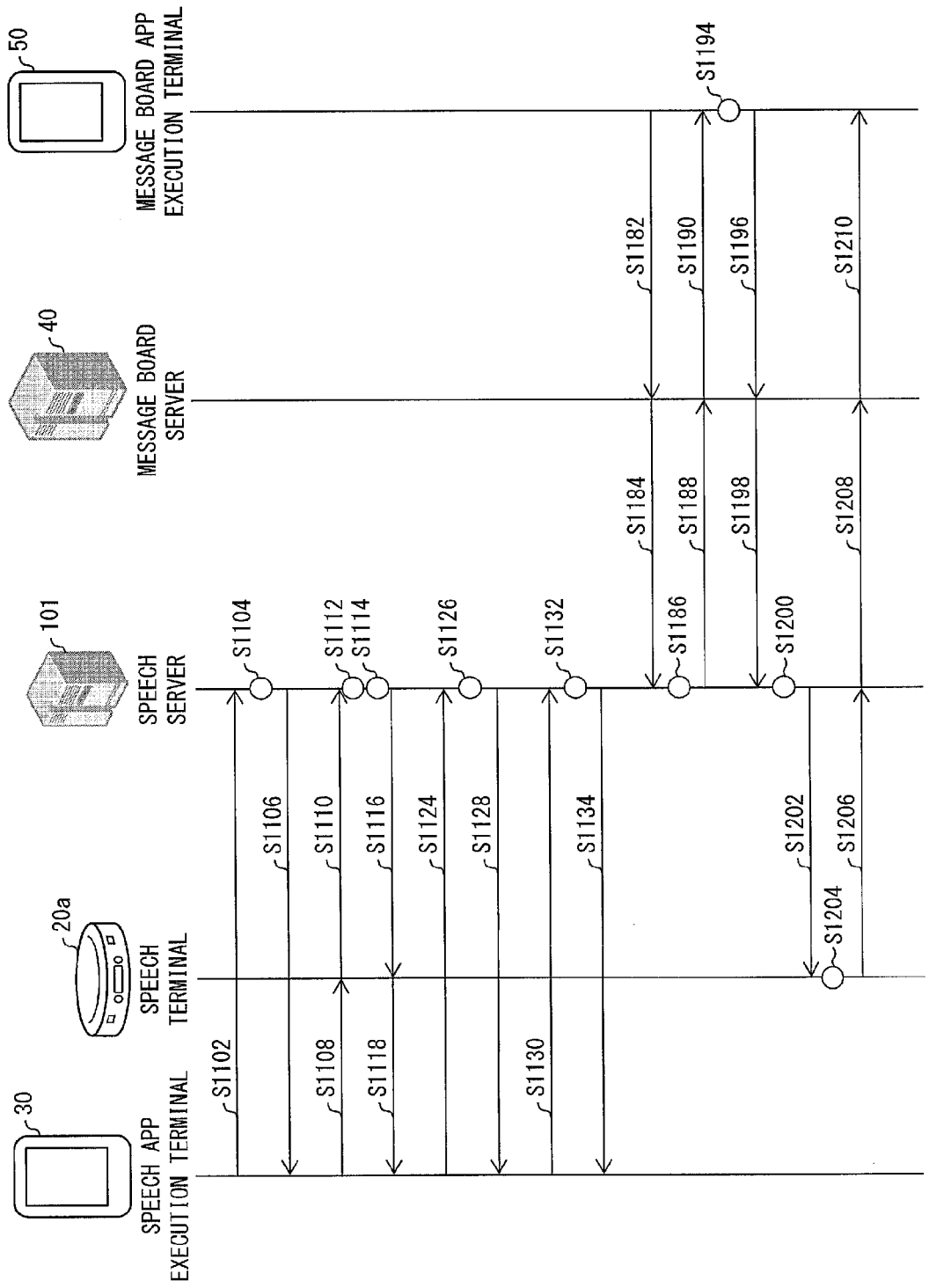
FIG. 5 is a sequence diagram showing a flow of data processing carried out in a speech service provided by a speech server in accordance with Embodiment 2 of the present invention.

The following description will discuss, with reference to FIG. 5, a speech server 101 in accordance with the present embodiment. The speech server 101 has the same arrangement as that of the speech server 1 in accordance with Embodiment 1. As such, for easy explanation, the same reference signs will be given to members each having the same function as a member described in Embodiment 1, and descriptions on such a member will be omitted. FIG. 5 is a sequence diagram showing a flow of data processing carried out in a speech service provided by the speech server 101.

(Registration of Speech Terminal 20a and Speech App Execution Terminal 30)

In the process of registering the speech terminal 20a and the speech app execution terminal 30 in the speech server 101, Steps S1102 through S1118 are the same as Steps S102 through S118 shown in FIG. 3, respectively. Accordingly, descriptions on Steps S1102 through S1118 will be omitted.

Step S1124: The user who uses the speech app execution terminal 30 inputs, into the speech app execution terminal 30, a nickname for identifying the speech terminal 20a. The speech app execution terminal 30 transmits, to the speech server 101, the speech terminal-specifying information of the speech terminal 20a and the nickname inputted by the user.

Step S1126: The control section 3 of the speech server 101 receives the nickname and the speech terminal-specifying information via the communication section 4. The control section 3 of the speech server 101 causes the nickname to be stored in the storage section 10 such that the nickname is associated with the speech terminal-specifying information stored in the storage section 10. Accordingly, the storage section 10 has stored therein the speech app execution terminal-specifying information, the speech terminal-specifying information, and the nickname of the speech terminal such that the speech app execution terminal-specifying information, the speech terminal-specifying information, and the nickname are associated with one another.

Step S1128: The control section 3 of the speech server 101 notifies, via the communication section 4, the speech app execution terminal 30 of information which indicates that the speech terminal-specifying information of the speech terminal 20a and the nickname of the speech terminal 20a are associated with each other.

Step S1130: In order to use the speech service, the speech app execution terminal 30 transmits, to the speech server 101, (i) the log-in information (the user ID and the password) given by the speech server 101 in advance and (ii) speech app execution terminal-specifying information that specifies the speech app execution terminal 30. This is a process for registering, in the speech server 101, the log-in information of the user who uses the speech app execution terminal 30.

Step S1132: The ID authentication section 11 of the speech server 101 refers to the storage section 10, and authenticates the received log-in information if the log-in information can be authenticated. In a case where the received log-in information can be authenticated, the ID authentication section 11 generates user-specifying information. The control section 3 causes the user-specifying information generated by the ID authentication section 11 to be stored in the storage section 10 such that the user-specifying information is associated with the speech app execution terminal-specifying information received from the speech app execution terminal 30.

Step S1134: The speech server 101 transmits, to the speech app execution terminal 30, an authentication result of the log-in information received from the speech app execution terminal 30. In a case where the speech server 101 has authenticated the received log-in information, the speech server 101 transmits, to the speech app execution terminal 30, (i) an authentication result that indicates that the received long-in information has been authenticated and (ii) the user-specifying information.

(Causing Message Board App Execution Terminal 50 to Speak)

Step S1182: In order to use the speech service, the transmission section 58 of the message board app execution terminal 50 transmits, to the message board server 40, the log-in information which has been given by the speech server 1.

Step S1184: The transmission section 45 of the message board server 40 transmits, to the speech server 101, the log-in information received by the reception section 44.

Step S1186: The ID authentication section 11 of the speech server 101 refers to the storage section 10. In a case where the received user ID can be authenticated, the ID authentication section 11 authenticates the received user ID. When the ID authentication section 11 authenticates the received user ID, the control section 3 of the speech server 1 refers to the storage section 10, and obtains the user-specifying information associated with the authenticated user ID.

Step S1188: The speech server 101 transmits, to the message board server 40, (i) a notification that the received user ID has been authenticated and (ii) the user-specifying information associated with the user ID.

Step S1190: The transmission section 45 of the message board server 40 transmits, to the message board app execution terminal 50, (i) a notification that the user ID received by the reception section 44 has been authenticated and (ii) the user-specifying information.

Step S1194: The display control section 59 of the control section 52 of the message board app execution terminal 50 indicates, on the display section 55 of the message board app execution terminal 50, that the transmitted user ID has been authenticated. At this time, the control section of the message board app execution terminal 50 may display, on the display section, the user-specifying information together with the authentication result. The user inputs, into the message board app execution terminal 50, speech information indicative of speech content to be outputted from a speech terminal as speech. In the present embodiment, the speech information is described as one that is represented by text data. Unlike Step S194 described in Embodiment 1, the user does not have to select a speech terminal to be cause to output speech in Step S1194.

Step S1196: The transmission section 58 of the message board app execution terminal 50 transmits, to the message board server 40, (i) an instruction for causing a speech terminal to output speech, the instruction including the speech information inputted by the user and (ii) the user-specifying information.

Step S1198: The transmission section 45 of the message board server 40 transmits, to the speech server 101, (i) the instruction, received by the reception section 44, for causing a speech terminal to output speech and (ii) the user-specifying information.

Step S1200: The control section 3 of the speech server 101 instructs the voice data generation section 13 to generate, on the basis of the content of the speech information, voice data for causing a selected speech terminal to output speech. Further, the speech terminal-specifying information list generation section 9 of the speech server 101 extracts, from among a plurality of pieces of speech terminal-specifying information stored in the storage section 10, speech terminal-specifying information associated with the received user-specifying information, and generates a speech terminal-specifying information list.

Step S1202: The control section 3 of the speech server 101 transmits, to each speech terminal listed in the speech terminal-specifying information list, (i) voice data thus generated and (ii) a speech instruction for causing the voice data to be outputted as speech (reproduced).

Step S1204: A control section of each speech terminal listed in the speech terminal-specifying information list reproduces the received voice data and causes the reproduced voice to be outputted from the speaker, on the basis of the received speech instruction. For example, the control section of the speech terminal 20a listed in the speech terminal-specifying information list reproduces the received voice data and causes the reproduced voice to be outputted from the speaker 23, on the basis of the received speech instruction.

Step S1206: Each speech terminal listed in the speech terminal-specifying information list transmits, to the speech server 101, a speech completion notification which indicates that the voice data has been reproduced on the basis of the speech instruction.

Step S1208: The speech instruction section 12 of the speech server 101 transmits, to the message board server 40, the speech completion notification received via the communication section 4. At this time, the speech server 101 can be configured such that every time the speech server 101 receives a speech completion notification from each speech terminal listed in the speech terminal-specifying information list, the speech server 101 transmits the received speech completion notification to the message board server 40. At this time, the speech completion notification can include the user-specifying information. This allows the message board server 40 to specify, on the basis of the user-specifying information received by the reception section 44, the message board app execution terminal 50 that has given an instruction to cause a speech terminal to output speech. Further, the speech server 101 can be configured such that, after transmitting the speech instruction to each speech terminal, the speech server 101 collectively transmits, to the notifications received within a predetermined period.

Step S1210: The transmission section 45 of the message board server 40 transmits, to the message board app execution terminal 50, the speech completion notification which the reception section 44 has received from the speech server 101. The display control section 59 of the control section 52 of the message board app execution terminal 50 displays the speech completion notification on the display section 55, thereby notifying the user that the speech has been completed.

Embodiment 3

Figure 6:
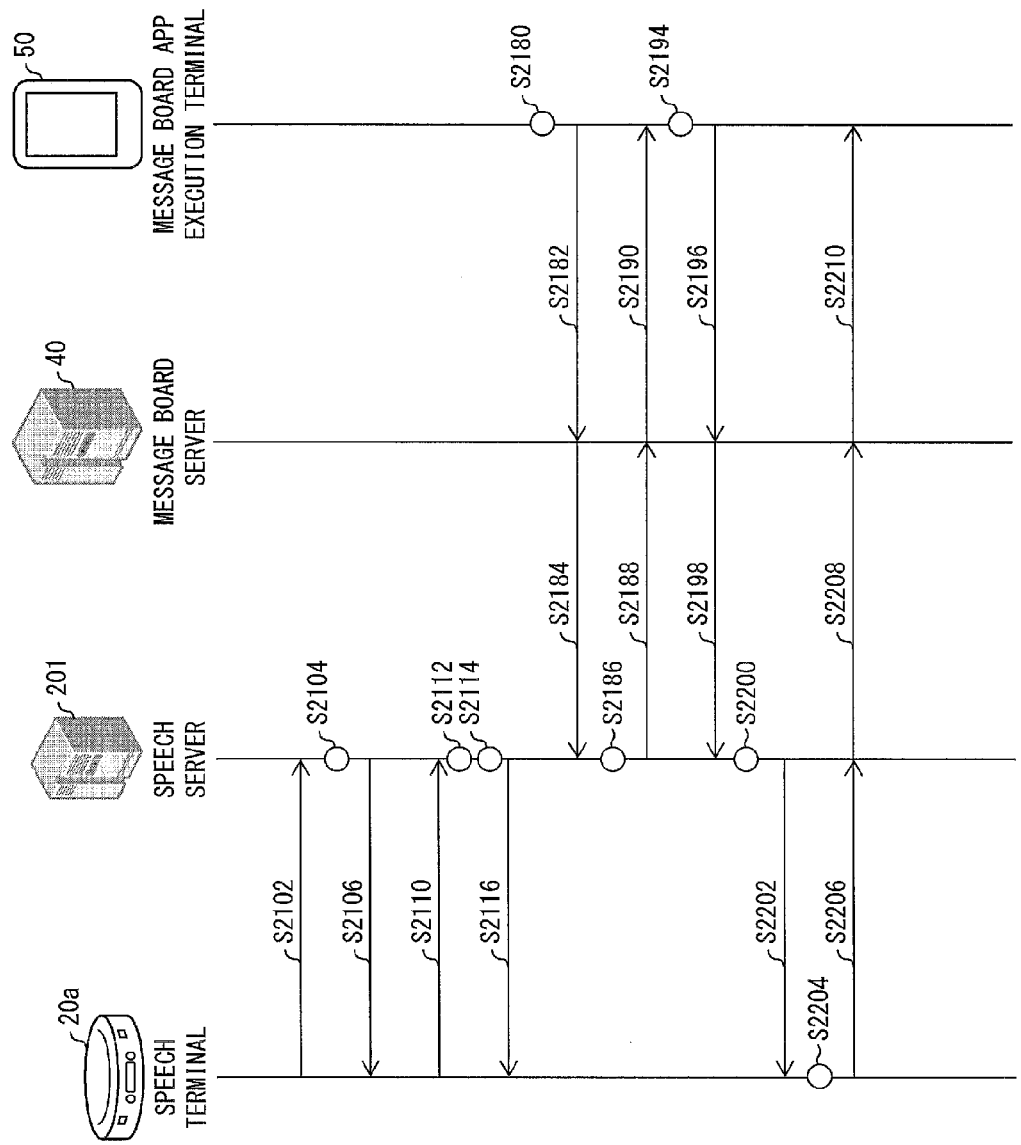
FIG. 6 is a sequence diagram showing a flow of data processing carried out in a speech service provided by a speech server in accordance with Embodiment 3 of the present invention.

The following description will discuss, with reference to FIG. 6, a speech server 201 in accordance with the present embodiment. The speech server 201 has the same arrangement as those of the speech server 1 and the speech server 101 in accordance with the embodiments described above. As such, for easy explanation, the same reference signs will be given to members each having the same function as a member described in Embodiment 1, and descriptions on such a member will be omitted. FIG. 6 is a sequence diagram showing a flow of data processing carried out in a speech service provided by the speech server 201.

(Speech Terminal 20a)

Step S2102: In the present embodiment, the speech terminal 20a is a speech terminal to be registered. The user operates an operation button included in the speech terminal 20a, thereby instructs the speech terminal 20a to make a request for speech terminal-specifying information to the speech server 201. Upon reception of the operation by the user, the speech terminal 20a makes a request for speech terminal-specifying information to the speech server 201.

Step S2104: Upon reception of the request for speech terminal-specifying information, the speech terminal-specifying information management section 6 of the speech server 201 generates speech terminal-specifying information that specifies the speech terminal 20a, and stores the speech terminal-specifying information in the storage section 10.

Step S2106: The speech server 201 transmits the speech terminal-specifying information to the speech terminal 20a.

Step S2110: The speech terminal 20a receives the speech terminal-specifying information. The user says "I want to have myself registered in the speech service" in a state where a voice recognition function of the speech terminal 20a is enabled. The speech terminal 20a recognizes the user's voice that says "I want to have myself registered in the speech service", and transmits, to the speech server 201, an instruction to start a process of registering the speech terminal 20a in the speech service.

Step S2112: Upon reception of the instruction to start the process of registering the speech terminal 20a in the speech device, the control section 3 of the speech server 201 generates an authentication character string. The authentication character string can be any character string that can be represented by using characters made up of a finite number of digits. The authentication character string can be constituted by any one type selected from numbers, alphabetical letters (uppercase letters and lowercase letters), hiragana letters (a type of Japanese syllabary), and katakana letters (another type of Japanese syllabary), or can be constituted by a combination of multiple types selected therefrom. The authentication character string can be, for example, a character string made up of a five-digit number, or a character string made up of a combination of four alphabetical letters and a number. Further, the authentication character string can be a word that sounds clear and familiar to the user. Specifically, the authentication character string can be 'mountain', 'river', or the like, or the name of a 'mountain', a 'river', an animal, or the like. In the present embodiment, the authentication character string is described as a character string made up of a five-digit number '12345'.

Step S2114: The voice data generation section 13 generates, in accordance with an instruction from the control section 3, authentication character string voice data which is voice data representing an authentication character string.

Step S2116: The control section 3 (authentication character string speech instruction unit) of the speech server 201 transmits, to the speech terminal 20a, an instruction to output the authentication character string voice data as speech. The speech terminal 20a reproduces the received authentication character string voice data, thereby outputting 'one, two, three, four, five' as speech.

Step S2180: When the user hears 'one, two, three, four, five' outputted from the speech terminal 20a as speech, the user inputs '12345' into the operation section 54 of the message board app execution terminal 50.

Step S2182: The transmission section 58 of the message board app execution terminal 50 obtains, from the operation instruction receiving section 60, an instruction signal indicative of the inputted character string '12345', 2Q and transmits the instruction signal to the message board server 40.

Step S2184: The transmission section 45 of the message board server 40 transmits, to the speech server 201, the character string '12345' received by the reception section 44.

Step S2186: The speech server 201 receives the character string '12345'. The control section 3 (character string determination unit) of the speech server 201 determines whether or not the character string '12345' received from the message board server 40 is identical in content to the authentication character string '12345'. In a case where the character string '12345' received from the message board server 40 is identical in content to the authentication character string '12345', the speech terminal-specifying information management section 6 manages, as information which is allowed to be provided to the message board server 40 (external server), the speech terminal-specifying information of the speech terminal 20a which is to be registered and has been caused to output the authentication character string '12345' as speech. Note that the control section 3 can be configured such that, when the control section 3 determines that the character string received from the message board server 40 is identical in content to the authentication character string, the control section 3 determines whether or not the authentication character string was generated within a predetermined period from a point when the character string was received from the message board server 40. The predetermined period can be set as appropriate, and is, for exam, five minutes.

Examples of a case where the character string received from the message board server 40 is identical in content to the authentication character string include a case in which the received character string is constituted by hiragana letters and the authentication character string is constituted by katakana letters. In general, criteria on the basis of which the character string received from the message board server 40 and the authentication character string are compared so as to determine whether or not the character string and the authentication character string are identical in content can be set as appropriate in accordance with the strictness of the authentication.

Step S2188: The control section 3 of the speech server 201 (i) selects the speech terminal-specifying information of the speech terminal 20a managed as the information which is allowed to be provided to the external server and (ii) transmits the speech terminal-specifying information to the message board server 40.

Step S2190: The transmission section 45 of the message board server 40 transmits, to the message board app execution terminal 50, the speech terminal-specifying information received by the reception section 44.

Step S2194: The reception section 57 of the message board app execution terminal 50 receives the speech terminal-specifying information of the speech terminal 20a. The user inputs, into the message board app execution terminal 50, speech content to be outputted as speech.

Step S2196: The transmission section 58 of the message board app execution terminal 50 transmits, to the message board server 40, an instruction for causing the speech terminal to output speech, the instruction including (i) the speech information indicative of the speech content inputted by the user and (ii) the speech terminal-specifying information of the speech terminal 20a.

Step S2198: The transmission section 45 of the message board server 40 transmits, to the speech server 201, the instruction for causing the speech terminal to output speech which instruction has been received by the reception section 44.

Step S2200: The control section 3 of the speech server 201 instructs the voice data generation section 13 to generate, on the basis of the content of the speech information, voice data for causing the speech terminal to output speech. Upon reception of the instruction, the voice data generation section 13 generates voice data.

Step S2202: The control section 3 of the speech server 201 transmits, to the speech terminal 20a, (i) the generated voice data and (ii) a speech instruction for causing the voice data to be outputted as speech (reproduced).

Step S2204: On the basis of the speech instruction received, the control section of the speech terminal 20a reproduces the voice data received, and causes a voice thus reproduced to be outputted from the speaker 23a.

Step S2206: The speech terminal 20a transmits, to the speech server 201, a speech completion notification which indicates that the voice data has been reproduced in accordance with the speech instruction.

Step S2208: The speech instruction section 12 of the speech server 201 transmits, to the message board server 40, the speech completion notification received via the communication section 4.

Step S2210: The transmission section 45 of the message board server 40 transmits, to the message board app execution terminal 50, the speech completion notification received from the reception section 44. The display control section 59 of the control section 52 of the message board app execution terminal 50 displays the speech completion notification on the display section 55, thereby notifying the user that the speech terminal 20a has completed speech.

According to the speech server 201, the control section 3 determines whether or not a character string received from the message board server 40 and an authentication character string coincide with each other. Further, in a case where the received character string and the authentication character string coincide with each other, the speech terminal-specifying information management section 6 manages, as information that is allowed to be provided to the message board server 40, speech terminal-specifying information that specifies the speech terminal 20a to be registered. In other words, by receiving, from the external server, the character string that coincides with the authentication character string, the speech server 201 can provide, to the external server, the speech terminal-specifying information that specifies the speech terminal 20a to be registered. Accordingly, the user who uses the message board service can receive a notification of the speech terminal-specifying information of the speech terminal 20a to be registered, without having to input the log-in information for the speech service.

Embodiment 4

The following description will discuss another aspect of the speech server 1 in accordance with Embodiment 1. As such, for easy explanation, the same reference signs will be given to members each having the same function as a member described in Embodiment 1, and descriptions on such a member will be omitted.

When a speech server 1 in accordance with the present embodiment receives an instruction for causing the speech terminal 20a to output speech, the speech server 1 transmits, to a speech terminal 20a, (i) speech information, (ii) an instruction to generate voice data on the basis of content of the speech information, and (iii) a speech instruction for causing the generated voice data to be outputted as speech (reproduced). This step corresponds to Steps S200 and S202 shown in FIG. 4.

The speech terminal 20a in accordance with the present embodiment includes a voice data generation section which generates voice data. A control section of the speech terminal 20a generates, in accordance with the received instruction to generate voice data, voice data for causing a speech terminal to output speech on the basis of the content of the speech information. Further, the control section of the speech terminal 20a reproduces the generated voice data, and causes the reproduced voice to be outputted from the speaker 23a.

As described above, the speech server in accordance with the present embodiment does not generate voice data, but transmits, to a selected speech terminal, an instruction to generate voice data on the basis of content of speech information. According to this arrangement, the speech server does not transmit generated voice data to the speech terminal. This makes it possible to reduce an amount of information transmitted from the speech server to the speech terminal.

Embodiment 5

Control blocks of each of the speech servers 1, 101, and 201 (particularly, the speech API 5, the speech terminal-specifying information management section 6, and the speech instruction section 12) may be realized by a logic circuit (hardware) provided in an integrated circuit (IC chip) or the like or may be realized by software executed by a CPU (Central Processing Unit).

In the latter case, each of the speech servers 1, 101, and 201 includes: a CPU that executes instructions of a program that is software realizing the foregoing functions; ROM (Read Only Memory) or a storage device (each referred to as 'storage medium') storing the program and various kinds of data in such a form that they are readable by a computer (or a CPU); and RAM (Random Access Memory) that develops the program in executable form; and the like. The object of the present invention can be achieved by a computer (or a CPU) reading and executing the program stored in the storage medium. The storage medium may be 'a non-transitory tangible medium' such as a tape, a disk, a card, a semiconductor memory, and a programmable logic circuit. Further, the program may be supplied to or made available to the computer via any transmission medium (such as a communication network and a broadcast wave) which enables transmission of the program. Note that the present invention can also be implemented by the program in the form of a computer data signal embedded in a carrier wave which is embodied by electronic transmission.

CONCLUSION

A speech server in accordance with Aspect 1 of the present invention is a speech server including: a speech terminal-specifying information management unit (speech terminal-specifying information management section 6) configured to manage speech terminal-specifying information which allows a speech terminal to be specified; a reception unit (speech API 5) configured to receive, from an external server, (i) the speech terminal-specifying information or user-specifying information and (ii) speech information indicative of speech content to be outputted as speech; and a speech instruction unit (speech instruction section 12) configured to instruct the speech terminal to output the speech content as speech, the speech terminal being identified by (i) the speech terminal-specifying information received from the external server or (ii) the speech terminal-specifying information associated with the user-specifying information received from the external server.

According to this arrangement, the reception unit receives, from the external server, (i) the speech terminal-specifying information or the user-specifying information and (ii) the speech information. Further, the speech instruction unit instructs the speech terminal to output the speech content as speech, the speech terminal being identified by (i) the speech terminal-specifying information received from the external server or (ii) the speech terminal-specifying information associated with the user-specifying information received from the external server. Accordingly, the speech server makes it possible to generate, from an external server, an instruction for causing a speech terminal associated with a specific user to output speech.

A speech server in accordance with Aspect 2 of the present invention may have an arrangement that is obtained by modifying the arrangement of Aspect 1 such that the speech server further includes voice data generation unit configured to generate voice data, the speech instruction unit providing, to the speech terminal, voice data generated by the voice data generation unit on the basis of the speech information.

According to this arrangement, the speech instruction unit provides the speech terminal with the voice data generated by the voice data generation unit. Accordingly, the speech server allows the speech terminal to output speech more easily.

A speech server in accordance with Aspect 3 of the present invention may have an arrangement that is obtained by modifying the arrangement of Aspect 1 or 2 such that, when the speech instruction unit receives, from the speech terminal, a speech completion notification which indicates that the speech terminal has completed speech, the speech instruction unit notifies the external server that the speech terminal has completed the speech.

According to this arrangement, the speech instruction unit notifies the external server that the speech terminal has completed the speech. In other words, the speech server notifies a user who uses a service provided by the external server that the speech terminal has completed the speech.

A speech server in accordance with Aspect 4 of the present invention may have an arrangement that is obtained by modifying the arrangement of any one of Aspects 1 through 3 such that the speech server further includes authentication character string speech instruction unit configured to instruct the speech terminal, which is to be registered, to output an authentication character string as speech, the reception unit receiving, from the external server, a character string inputted by a user, the speech server further including character string determination unit configured to make a determination of whether or not the character string received from the external server and the authentication character string are identical to each other in content, on the basis of a result of the determination by the character string determination unit, the speech terminal-specifying information management unit managing, as information that is allowed to be provided to the external server, the speech terminal-specifying information that identifies the speech terminal to be registered.

According to this arrangement, the character string determination unit determines whether or not the character string received from the external server and the authentication character string are identical to each other. Further, in a case where the received character string and the authentication character string are identical to each other, the speech terminal-specifying information management unit manages, as information that is allowed to be provided to the external server, the speech terminal-specifying information that specifies the speech terminal to be registered. In other words, by receiving, from external server, the character string identical to the authentication character string, the speech server can provide, to the external server, the speech terminal-specifying information that specifies the speech terminal to be registered.

A speech server in accordance with Aspect 5 of the present invention may have an arrangement that is obtained by modifying the arrangement of any one of Aspects 1 through 4 such that the speech server further includes associating unit configured to associate the user-specifying information and the speech terminal-specifying information with each other on the basis of information provided from a terminal capable of communicating with the speech terminal. According to this arrangement, the associating unit can associate the user-specifying information and the speech terminal-specifying information with each other on the basis of the information provided from the terminal capable of communicating with the speech terminal.

A speech method in accordance with Aspect 6 of the present invention is a speech method including the steps of: managing speech terminal-specifying information which allows a speech terminal to be specified; receiving, from an external server, (i) the speech terminal-specifying information or user-specifying information and (ii) speech information indicative of speech content to be outputted as speech; and instructing the speech terminal to output the speech content as speech, the speech terminal being identified by (i) the speech terminal-specifying information received from the external server or (ii) the speech terminal-specifying information associated with the user-specifying information received from the external server.

This arrangement provides an advantageous effect similar to that of a speech server in accordance with one aspect of the present invention.

A speech system in accordance with Aspect 7 of the present invention is a speech system including: a speech server (1); and a speech terminal (20), the speech server including: a speech terminal-specifying information management unit (speech terminal-specifying information management section 6) configured to manage speech terminal-specifying information which allows a speech terminal to be specified; a reception unit (speech API 5) configured to receive, from an external server, (i) the speech terminal-specifying information or user-specifying information and (ii) speech information indicative of speech content to be outputted as speech; and a speech instruction unit (speech instruction section 12) configured to instruct the speech terminal to output the speech content as speech, the speech terminal being identified by (i) the speech terminal-specifying information received from the external server or (ii) the speech terminal-specifying information associated with the user-specifying information received from the external server, the speech terminal including a control unit (control section 22) configured to control a speaker to output the speech content as speech in accordance with an instruction from the speech server to output the speech content as speech.

This arrangement makes it possible to provide a system which includes (i) a speech server in accordance with one aspect of the present invention and (ii) a speech terminal which outputs speech in accordance with an instruction from the speech server.

A speech terminal (20) in accordance with Aspect 8 of the present invention is a speech terminal including a control unit (control section 22) configured to control a speaker to output speech content as speech in accordance with an instruction from a speech server to output the speech content as speech, the speech terminal being specified by (i) speech terminal-specifying information which the speech server receives from an external server and which allows the speech terminal to be identified or (ii) the speech terminal-specifying information associated with user-specifying information which the speech server receives from the external server.

This arrangement makes it possible to provide a speech terminal in a speech system in accordance with one aspect of the present invention.

A speech system in accordance with Aspect 9 of the present invention is a speech system including: a mobile terminal (message board app execution terminal 50); an external server (message board server 40); a speech server (1); and a speech terminal (20), the mobile terminal including a mobile terminal transmission unit (transmission section 58) configured to transmit, to the external server, (i) speech terminal-specifying information which allows the speech terminal to be specified, or user-specifying information and (ii) speech information indicative of speech content to be outputted from the speech terminal as speech, the external server including: an external server reception unit (reception section 44) configured to receive, from the mobile terminal, (i) the speech terminal-specifying information or the user-specifying information and (ii) the speech information; and an external server transmission unit (transmission section 45) configured to transmit (i) the speech terminal-specifying information or the user-specifying information and (ii) the speech information each received by the external server reception unit, the speech server including: a speech terminal-specifying information management unit (speech terminal-specifying information management section 6) configured to manage the speech terminal-specifying information; a speech server reception unit (speech API 5) configured to receive, from the external server, (i) the speech terminal-specifying information or the user-specifying information and (ii) the speech information; and a speech instruction unit (speech instruction section 12) configured to instruct the speech terminal to output the speech content as speech, the speech terminal being identified by (i) the speech terminal-specifying information received by the speech server reception unit or (ii) the speech terminal-specifying information associated with the user-specifying information received by the speech server reception unit, the speech terminal including a control unit (control section 22) configured to control a speaker to output the speech content as speech in accordance with an instruction from the speech server to output the speech content as speech.

This arrangement makes it possible to provide a system which includes (i) a speech server in accordance with one aspect of the present invention, (ii) an external server in accordance with one aspect of the present invention, (iii) a mobile terminal which transmits, to the external server, (a) speech terminal-specifying information or user-specifying information and (b) speech information, and (iv) a speech terminal which outputs speech in accordance with an instruction from the speech server.

A mobile terminal (message board app execution terminal 50) in accordance with Aspect 10 of the present invention is a mobile terminal including a transmission unit (transmission section 58) configured to transmit, to a speech server via an external server, (i) speech terminal-specifying information or user-specifying information and (ii) speech information indicative of speech content, the speech server (i) managing the speech terminal-specifying information which allows a speech terminal to be identified and (ii) instructing the speech terminal to output the speech content as speech, the speech terminal being specified by (a) the speech terminal-specifying information or (b) the speech terminal-specifying information associated with user-specifying information.

This arrangement makes it possible to provide a mobile terminal in a speech system in accordance with one aspect of the present invention.

The speech server in accordance with the forgoing aspects of the present invention may be realized by a computer. In this case, the present invention encompasses a program for the serer which program causes a computer to operate as each of the units of the speech server so that the speech server can be realized by the computer.

The present invention is not limited to the above-described embodiments but allows various modifications within the scope of the claims. Any embodiment derived from an appropriate combination of the technical means disclosed in the different embodiments will also be included in the technical scope of the present invention. Further, a new technical feature can be made by combining technical means disclosed in the respective embodiments.

INDUSTRIAL APPLICABILITY

The present invention is applicable to a speech server which instructs a terminal to output speech, a speech method, and a program.

REFERENCE SIGNS LIST

1: SPEECH SERVER
2: BUS
3: CONTROL SECTION
4: COMMUNICATION SECTION
5: SPEECH API (RECEPTION UNIT)
6: SPEECH TERMINAL-SPECIFYING INFORMATION MANAGEMENT SECTION (SPEECH TERMINAL-SPECIFYING INFORMATION MANAGEMENT UNIT)
7: SPEECH APP EXECUTION TERMINAL-SPECIFYING INFORMATION MANAGEMENT SECTION
8: MESSAGE BOARD APP EXECUTION TERMINAL-SPECIFYING INFORMATION MANAGEMENT SECTION

9: SPEECH TERMINAL-SPECIFYING INFORMATION LIST GENERATION SECTION
10: STORAGE SECTION
11: ID AUTHENTICATION SECTION
12: SPEECH INSTRUCTION SECTION (SPEECH INSTRUCTION UNIT)
13: VOICE DATA GENERATION SECTION
20a, 20b: SPEECH TERMINAL
30: SPEECH APP EXECUTION TERMINAL
40: MESSAGE BOARD SERVER (EXTERNAL SERVER)
41: COMMUNICATION SECTION
42: CONTROL SECTION
43: STORAGE SECTION
44: RECEPTION SECTION (EXTERNAL SERVER RECEPTION UNIT)
45: TRANSMISSION SECTION (EXTERNAL SERVER TRANSMISSION UNIT)
46: MESSAGE BOARD SERVICE PROVIDING SECTION
50: MESSAGE BOARD APP EXECUTION TERMINAL (MOBILE TERMINAL)
51: COMMUNICATION SECTION
52: CONTROL SECTION
53: STORAGE SECTION
54: OPERATION SECTION
55: DISPLAY SECTION
56: MESSAGE BOARD APP EXECUTION SECTION
57: RECEPTION SECTION
58: TRANSMISSION SECTION (MOBILE TERMINAL TRANSMISSION UNIT, TRANSMISSION UNIT)
59: DISPLAY CONTROL SECTION
60: OPERATION INSTRUCTION RECEIVING SECTION

The invention claimed is:

1. A speech server comprising:
a speech terminal-specifying information management unit configured to manage one or a plurality of pieces of speech terminal-specifying information and user-specifying information such that each of the one or a plurality of pieces of speech terminal-specifying information and the user-specifying information are associated with each other, each of the one or a plurality of pieces of speech terminal-specifying information allowing a corresponding one of one or a plurality of speech terminals to be specified, the user-specifying information being of a user who is capable of causing the corresponding one of the one or a plurality of speech terminals to output speech;
a transmission unit configured to receive the user-specifying information from an external server and transmit, to the external server, the one or a plurality of pieces of speech terminal-specifying information associated with the user-specifying information;
a reception unit configured to receive, from the external server, (i) speech terminal-specifying information selected from the one or a plurality of pieces of speech terminal-specifying information transmitted to the external server and (ii) speech information indicative of speech content to be outputted as speech; and
a speech instruction unit configured to instruct a speech terminal to output the speech content as speech, the speech terminal being identified among the one or a plurality of speech terminals by the speech terminal-specifying information received from the external server.

2. A speech server as set forth in claim 1, further comprising a voice data generation unit configured to generate voice data,
the speech instruction unit providing, to the speech terminal, voice data generated by the voice data generation unit on the basis of the speech information.

3. The speech server as set forth in claim 1, wherein:
when the speech instruction unit receives, from the speech terminal, a speech completion notification which indicates that the speech terminal has completed speech, the speech instruction unit notifies the external server that the speech terminal has completed the speech.

4. A speech server as set forth in claim 1, further comprising an authentication character string speech instruction unit configured to instruct the speech terminal, which is to be registered, to output an authentication character string as speech,
the reception unit receiving, from the external server, a character string inputted by a user,
the speech server further comprising a character string determination unit configured to make a determination of whether or not the character string received from the external server and the authentication character string are identical to each other in content,
on the basis of a result of the determination by the character string determination unit, the speech terminal-specifying information management unit managing, as information that is allowed to be provided to the external server, the speech terminal-specifying information that identifies the speech terminal to be registered.

5. A speech server as set forth in claim 1, further comprising an associating unit configured to associate the user-specifying information and each of the one or a plurality of pieces of speech terminal-specifying information with each other on the basis of information provided from a terminal capable of communicating with the speech terminal.

6. A speech method comprising the steps of:
managing one or a plurality of pieces of speech terminal-specifying information and user-specifying information such that each of the one or a plurality of pieces of speech terminal-specifying information and the user-specifying information are associated with each other, each of the one or a plurality of pieces of speech terminal-specifying information allowing a corresponding one of one or a plurality of speech terminals to be specified the user-specifying information being of a user who is capable of causing the corresponding one of the one or a plurality of speech terminals to output speech;
receiving the user-specifying information from an external server and transmitting, to the external server, the one or a plurality of pieces of speech terminal-specifying information associated with the user-specifying information;
receiving, from the external server, (i) speech terminal-specifying information selected from the one or a plurality of pieces of speech terminal-specifying information transmitted to the external server and (ii) speech information indicative of speech content to be outputted as speech; and
instructing a speech terminal to output the speech content as speech, the speech terminal being identified among the one or a plurality of speech terminals by the speech terminal-specifying information received from the external server.

7. A computer-readable non-transitory recording medium that stores a program for causing a computer to function as a speech server,
the speech server including:
a speech terminal-specifying information management unit configured to manage one or a plurality of pieces of speech terminal-specifying information and user-specifying information such that each of the one or a plurality of pieces of speech terminal-specifying information and the user-specifying information are associated with each other, each of the one or a plurality of pieces of speech terminal-specifying information allowing a corresponding one of one or a plurality of speech terminals to be specified, the user-specifying information being of a user who is capable of causing the corresponding one of the one or a plurality of speech terminals to output speech;
a transmission unit configured to receive the user-specifying information from an external server and transmit, to the external server, the one or a plurality of pieces of speech terminal-specifying information associated with the user-specifying information;
a reception unit configured to receive, from the external server, (i) the speech terminal-specifying information selected from the one or a plurality of pieces of speech terminal-specifying information transmitted to the external server and (ii) speech information indicative of speech content to be outputted as speech; and
a speech instruction unit configured to instruct a speech terminal to output the speech content as speech, the speech terminal being identified among the one or a plurality of speech terminals by the speech terminal-specifying information received from the external server,
the program being configured to cause a computer to function as each of the units of the speech server.

8. A speech system comprising:
a speech server; and
one or a plurality of speech terminals,
the speech server including:
a speech terminal-specifying information management unit configured to manage one or a plurality of pieces of speech terminal-specifying information and user-specifying information such that each of the one or a plurality of pieces of speech terminal-specifying information and the user-specifying information are associated with each other each of the one or a plurality of pieces of speech terminal-specifying information allowing a corresponding one of the one or a plurality of speech terminals to be specified the user-specifying information being of a user who is capable causing the corresponding one of the one or a plurality of speech terminals to output speech;
a transmission unit configured to receive the user-specifying information from an external server and transmit, to the external server, the one or a plurality of pieces of speech terminal-specifying information associated with the user-specifying information;
a reception unit configured to receive, from the external server, (i) speech terminal-specifying information selected from the one or a plurality of pieces of speech terminal-specifying information transmitted to the external server and (ii) speech information indicative of speech content to be outputted as speech; and
a speech instruction unit configured to instruct a speech terminal to output the speech content as speech, the speech terminal being identified among the one or a plurality of speech terminals by the speech terminal-specifying information received from the external server,
the speech terminal including a control unit configured to control a speaker to output the speech content as speech in accordance with an instruction from the speech server to output the speech content as speech.

9. One or a plurality of speech terminals, each comprising a control unit configured to control a speaker to output speech content as speech in accordance with an instruction from a speech server to output the speech content as speech,
each of the one or a plurality of speech terminals being specified by (i) speech terminal-specifying information which the speech server receives from an external server and which allows each of the one or a plurality of speech terminals to be identified or (ii) speech terminal-specifying information associated with user-specifying information which the speech server receives from the external server,
the speech server (i) managing one or a plurality of pieces of speech terminal-specifying information and user-specifying information such that each of the one or a plurality of pieces of speech terminal-specifying information and the user-specifying information are associated with each other, each of the one or a plurality of pieces of speech terminal-specifying information allowing a corresponding one of the one or a plurality of speech terminals to be specified, the user-specifying information being of a user who is capable of causing the corresponding one of the one or a plurality of speech terminals to output speech and (ii) instructing a speech terminal to output the speech content as speech, the speech terminal being specified among the one or a plurality of speech terminals by the speech terminal-specifying information.

10. A speech system comprising:
a mobile terminal;
an external server;
a speech server; and
one or a plurality of speech terminals,
the mobile terminal including a mobile terminal transmission unit configured to transmit, to the external server, (i) speech terminal-specifying information which allows corresponding one of the one or a plurality of speech terminals to be specified, or user-specifying information and (ii) speech information indicative of speech content to be outputted from the corresponding one of the one or a plurality of speech terminals as speech,
the external server including:
an external server reception unit configured to receive, from the mobile terminal, (i) the speech terminal-specifying information or the user-specifying information and (ii) the speech information; and
an external server transmission unit configured to transmit (i) the speech terminal-specifying information or the user-specifying information and (ii) the speech information each received by the external server reception unit,
the speech server including:
a speech terminal-specifying information management unit configured to manage one or a plurality of pieces of speech terminal-specifying information and user-specifying information such that each of the one or a plurality of pieces of speech terminal-specifying information and the user-specifying information are associated with each other, each of the one or a plurality of pieces of speech terminal-specifying information allowing a corresponding one of the one or a plurality of speech terminals to be specified, the user-specifying information being of a user who is capable of causing the corresponding one of the one or a plurality of speech terminals to output speech;

a speech server transmission unit configured to receive the user-specifying information from an external server and transmit, to the external server, the one or a plurality of pieces of speech terminal-specifying information associated with the user-specifying information;

a speech server reception unit configured to receive, from the external server, (i) speech terminal-specifying information selected from the one or a plurality of pieces of speech terminal-specifying information transmitted to the external server and (ii) the speech information; and a speech instruction unit configured to instruct a speech terminal to output the speech content as speech, the speech terminal being identified among the one or a plurality of speech terminals by the speech terminal-specifying information received by the speech server reception unit, the speech terminal including a control unit configured to control a speaker to output the speech content as speech in accordance with an instruction from the speech server to output the speech content as speech.

11. A mobile terminal comprising a transmission unit configured to transmit, to a speech server via an external server, (i) speech terminal-specifying information or user-specifying information and (ii) speech information indicative of speech content, the speech server (i) managing one or a plurality of pieces of speech terminal-specifying information and user-specifying information such that each of the one or a plurality of pieces of speech terminal-specifying information and the user-specifying information are associated with each other, each of the one or a plurality of pieces of speech terminal-specifying information allowing a corresponding one of one or a plurality of speech terminals to be specified the user-specifying information being of a user who is capable of causing the corresponding one of the one or a plurality of speech terminals to output speech and (ii) instructing a speech terminal to output the speech content as speech, the speech terminal being specified among the one or a plurality of speech terminals by the speech terminal-specifying information.

* * * * *